United States Patent
Baker et al.

(10) Patent No.: US 9,457,313 B2
(45) Date of Patent: *Oct. 4, 2016

(54) MEMBRANE TECHNOLOGY FOR USE IN A POWER GENERATION PROCESS

(75) Inventors: Richard W. Baker, Palo Alto, CA (US); Timothy C. Merkel, Menlo Park, CA (US); Johannes G. Wijmans, Menlo Park, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/548,827

(22) Filed: Jul. 13, 2012

(65) Prior Publication Data

US 2012/0272657 A1    Nov. 1, 2012

Related U.S. Application Data

(63) Continuation-in-part of application No. 13/115,726, filed on May 25, 2011, now Pat. No. 8,220,248, and a continuation-in-part of application No. 13/122,136, filed as application No. PCT/US2010/002480 on Sep. 13, 2010, now Pat. No. 8,177,885.

(51) Int. Cl.
*B01D 53/22* (2006.01)
*B01D 53/62* (2006.01)
(Continued)

(52) U.S. Cl.
CPC ............... *B01D 53/22* (2013.01); *B01D 53/62* (2013.01); *F02C 3/34* (2013.01); *F23C 9/00* (2013.01); *B01D 2256/22* (2013.01); *B01D 2257/102* (2013.01); *B01D 2257/104* (2013.01); *B01D 2257/504* (2013.01);
(Continued)

(58) Field of Classification Search
CPC ...... Y02C 10/10; Y02C 10/04; Y02E 20/16; Y02E 20/322; B01D 53/228; B01D 2257/504; B01D 53/22; B01D 53/62; B01D 2256/22; B01D 2257/102; B01D 2257/104; B01D 2258/0283; F02C 3/34; F23C 9/00; F23L 2900/07001
USPC ............................. 95/43, 45, 51; 96/4, 7, 9
See application file for complete search history.

(56) References Cited

U.S. PATENT DOCUMENTS 2,651,176 A * 9/1953 Yellott ....................... 60/39.464
3,651,640 A * 3/1972 Nicita ....................... F02C 7/36
60/39.24

(Continued)

FOREIGN PATENT DOCUMENTS

WO    WO 2009139835 A1 * 11/2009

OTHER PUBLICATIONS

Perry, R.H.; Green, D.W. (1997). Perry's Chemical Engineers' Handbook (7th Edition). (pp. 22-64). McGraw-Hill.*
(Continued)

*Primary Examiner* — Anthony Shumate
(74) *Attorney, Agent, or Firm* — Timothy A. Hott; Kathi Bean; Janet Farrant

(57) ABSTRACT

Disclosed herein is a power generation process in which a portion of the carbon dioxide generated by gaseous fuel combustion is recycled back to the power generation process, either pre-combustion, post-combustion, or both. The power generation process of the invention may be a combined cycle process or a traditional power generation process. The process utilizes sweep-based membrane separation.

6 Claims, 11 Drawing Sheets

(51) Int. Cl.
*F02C 3/34* (2006.01)
*F23C 9/00* (2006.01)

(52) U.S. Cl.
CPC .......... *B01D 2258/0283* (2013.01); *F23L 2900/07001* (2013.01); *Y02C 10/04* (2013.01); *Y02C 10/10* (2013.01); *Y02E 20/16* (2013.01); *Y02E 20/322* (2013.01)

(56) References Cited

U.S. PATENT DOCUMENTS

| | | | |
|---|---|---|---|
| 4,931,070 A | 6/1990 | Prasad | |
| 4,963,165 A | 10/1990 | Blume et al. | |
| 5,034,126 A | 7/1991 | Reddy et al. | |
| 5,240,471 A | 8/1993 | Barbe et al. | |
| 5,500,036 A | 3/1996 | Kalthod | |
| 5,641,337 A | 6/1997 | Arrowsmith et al. | |
| 5,681,433 A | 10/1997 | Friesen et al. | |
| 5,724,805 A * | 3/1998 | Golomb | F01K 23/106 60/39.12 |
| 5,843,209 A | 12/1998 | Ray et al. | |
| 6,139,604 A * | 10/2000 | Gottzmann et al. | 95/54 |
| 6,298,664 B1 | 10/2001 | Åsen et al. | 60/649 |
| 6,478,852 B1 | 11/2002 | Callaghan | |
| 6,702,570 B2 * | 3/2004 | Shah | F23L 7/007 122/1 A |
| 6,821,501 B2 * | 11/2004 | Matzakos et al. | 423/652 |
| 6,951,111 B2 * | 10/2005 | Chen | F02C 3/30 60/39.5 |
| 7,966,829 B2 * | 6/2011 | Finkenrath et al. | 60/772 |
| 8,016,923 B2 * | 9/2011 | Baker et al. | 96/4 |
| 8,025,715 B2 * | 9/2011 | Wijmans et al. | 95/51 |
| 8,034,168 B2 * | 10/2011 | Wijmans et al. | 96/4 |
| 8,220,247 B2 * | 7/2012 | Wijmans et al. | 60/39.5 |
| 8,220,248 B2 * | 7/2012 | Wijmans et al. | 60/39.5 |
| 8,246,718 B2 * | 8/2012 | Wijmans et al. | 95/51 |
| 9,140,186 B2 * | 9/2015 | Wei | B01D 53/22 |
| 2003/0131582 A1 * | 7/2003 | Anderson | F01K 23/068 60/39.55 |
| 2005/0053878 A1 * | 3/2005 | Bruun et al. | 431/11 |
| 2008/0127632 A1 * | 6/2008 | Finkenrath et al. | 60/274 |
| 2010/0236404 A1 | 9/2010 | Baker et al. | |
| 2010/0300114 A1 * | 12/2010 | Mhadeshwar et al. | 60/783 |
| 2011/0005272 A1 * | 1/2011 | Wijmans et al. | 62/617 |
| 2011/0167821 A1 * | 7/2011 | Baker et al. | 60/643 |
| 2011/0200491 A1 * | 8/2011 | Wijmans et al. | 422/169 |
| 2011/0219777 A1 * | 9/2011 | Wijmans et al. | 60/772 |
| 2011/0219778 A1 * | 9/2011 | Wijmans et al. | 60/772 |
| 2012/0055385 A1 * | 3/2012 | Lien et al. | 110/345 |
| 2012/0131925 A1 * | 5/2012 | Mittricker | F23C 9/00 60/772 |
| 2013/0058853 A1 * | 3/2013 | Baker et al. | 423/228 |
| 2013/0086917 A1 * | 4/2013 | Slobodyanskiy | F23R 3/28 60/773 |
| 2013/0104525 A1 * | 5/2013 | Allam | F25J 3/04018 60/273 |
| 2013/0125554 A1 * | 5/2013 | Mittricker | F01K 23/10 60/772 |
| 2013/0200625 A1 * | 8/2013 | Wei et al. | 290/52 |
| 2013/0213049 A1 * | 8/2013 | Allam | F02C 3/20 60/773 |
| 2013/0283808 A1 * | 10/2013 | Kolvick | F02C 7/18 60/772 |
| 2014/0366549 A1 * | 12/2014 | Wang | F02C 3/30 60/772 |
| 2014/0374109 A1 * | 12/2014 | Denton | B01D 53/62 166/309 |

OTHER PUBLICATIONS

King Saud University "Reverse Osmosis" pp. 409-452, Sep. 30, 2010, http://faculty.ksu.edu.sa/Almutaz/Documents/ChE-413/Reverse%20Osmosis.pdf.*
US 4,981,498, 01/1991, Bikson et al. (withdrawn)

* cited by examiner (not in accordance with the invention)

(not in accordance with the invention)

(not in accordance with the invention)

(not in accordance with the invention)

MEMBRANE TECHNOLOGY FOR USE IN A POWER GENERATION PROCESS

RELATED APPLICATIONS

The present application is a continuation-in-part and claims the benefit of both (1) U.S. application Ser. No. 13/115,726, filed May 25, 2011, which issued Jul. 17, 2012, as U.S. Pat. No. 8,220,248; which is a continuation-in-part and claims the benefit of U.S. application Ser. No. 13/122,136, filed Mar. 31, 2011, which issued May 15, 2012, as U.S. Pat. No. 8,177,885; which is a national stage application of, and claims the benefit of, PCT Application No. PCT/US10/02480, filed Sep. 13, 2010; and (2) U.S. application Ser. No. 13/122,136, filed Mar. 31, 2011, which issued May 15, 2012, as U.S. Pat. No. 8,177,885; which is a national stage application of, and claims the benefit of, PCT Application No. PCT/US10/02480, filed Sep. 13, 2010; the disclosures of which are hereby incorporated herein by reference in their entireties.

FIELD OF THE INVENTION

The invention pertains to a power generation process in which a portion of the carbon dioxide generated by gaseous fuel combustion is recycled back to the power generation process, either pre-combustion, post-combustion, or both. The power generation process may be a combined cycle process or a traditional power generation process.

BACKGROUND OF THE INVENTION

In a traditional power generation process, a gaseous fuel (such as natural gas or syngas) is combusted in the presence of oxygen, producing a stream of hot, high-pressure gas. This hot, high-pressure gas is then used to drive a gas turbine, which in turn drives a generator, producing electrical energy. The exhaust gas from the turbine is still very hot and may contain as much as 50% of the energy generated by the combustion process. This remaining heat (i.e., in the form of hot exhaust fumes) is wasted.

In recent years, there has been considerable interest in combined cycle power generation to improve the energy efficiency of the process. A combined cycle power plant generates additional electricity by using the hot exhaust gas from a gas turbine to boil water to make steam. The steam, in turn, is used to drive a steam turbine, generating additional electricity. Combined cycle power generation processes are well-known in the art and are described, for example, by Rolf Kehlhofer et al. in *Combined-Cycle Gas & Steam Power Plants* (3$^{rd}$ ed., PennWell Corporation; Tulsa, Okla., 2009).

A flow diagram of a conventional gas turbine power generation process is shown in FIG. 6. In this unit, an incoming air stream 602 is compressed from atmospheric pressure to 20-30 bar in an air compressor unit 619. This compressed gas stream 603 is then combusted with the incoming fuel gas 601 (which is typically but not necessarily natural gas) in combustor 604. The hot, high-pressure gas from the combustor is then expanded through the gas turbine 606. The gas turbine 606 is mechanically linked to the air compressor 619 and an electrical power generator 611. The low-pressure exhaust gas exhaust gas 605 from the gas turbine 606 is still hot, so the energy content from this gas can optionally be recovered in a steam boiler 612 which, in a combined cycle operation, is used to make additional electricity in a secondary steam turbine.

A major issue in the design of these units is the temperature of the gas leaving the combustor. This gas stream can be too hot to allow efficient and safe use in the gas turbine. For this reason, a diluent stream of nitrogen or steam or other gas may be mixed with the air stream going to the air compressor 619. This diluent stream serves to control the temperature of stream 607 leaving the combustor. Oftentimes, the volume of this diluent stream can be equal or more than the stoichiometric volume of air required to combust the fuel.

Although nitrogen, steam, and other gases are used as a diluent, more commonly, the gas entering the combustor 604 is diluted by using an air stream that is two or even three-fold larger than the stoichiometric volume of gas required to combust the fuel. The excess air is the oxygen-containing gas that cools stream 607. In some cases, all of the air stream leaving the gas compressor 619 is sent to the combustor 604. But in other gas turbines, a portion of the compressed air may be mixed with the combustion exhaust after the combustor, shown as optional gas stream 610. This mixing option may be done before the gas turbine or within the gas turbine.

When excess air is used as the oxygen-containing gas, the exhaust gas 615 from the turbine will often only contain 4-5% carbon dioxide. Recovery of carbon dioxide from this dilute, low-pressure, yet very high-volume gas stream is expensive. In recent years, a number of turbine producers have modified the operation of these turbines by using a portion 608 of the exhaust gas 615 as the oxygen-containing gas 613 for air stream 602. Recycling the exhaust gas in this way increases the carbon dioxide concentration in the final exhaust gas from 4-5% to 8-10% and reduces the volume of gas that must be treated if carbon dioxide sequestration is to be done. This process significantly reduces the cost of carbon dioxide sequestration from the exhaust gas.

The amount of exhaust gas that can be recycled is limited by the oxygen content of the gas mixture 603 delivered to the combustion chamber 604. When excess air is used as the diluent, this gas contains about 21% oxygen; when the exhaust gas is recycled and used as a diluent, the oxygen content can drop to 15% or less. If the oxygen content drops below about 15%, changes to the turbine design will be required.

A combined cycle power generation process, in which the energy content of the hot exhaust gas from the gas turbine is recovered in a steam boiler which is used to make additional electricity in a secondary steam turbine, is inherently more expensive than the more traditional, gas turbine-only power generation process due to the additional capital equipment required. However, it is expected that the additional energy generated will eventually more than off-set the cost of the additional equipment. As a result, most new gas power plants in North America and Europe are combined cycle.

In either a traditional or combined cycle power generation process, combustion of gaseous fuels produces exhaust gases contaminated with carbon dioxide that contribute to global warming and environmental damage. Such gas streams are difficult to treat in ways that are both technically and economically practical, and there remains a need for better treatment techniques.

Combustion of gaseous fuels also generates enormous amounts of heat. Therefore, another consideration in the power generation process is to moderate the temperature of the gas entering the turbine(s), to avoid melting or otherwise damaging turbine components.

Gas separation by means of membranes is a well-established technology. In an industrial setting, a total pressure difference is usually applied between the feed and permeate sides, typically by compressing the feed stream or maintaining the permeate side of the membrane under partial vacuum.

Although permeation by creating a feed to permeate pressure difference is the most common process, it is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070; 4,981,498; and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

The use of a process including a membrane separation step operated in sweep mode for treating flue gas to remove carbon dioxide is taught in co-owned and copending U.S. patent application Ser. No. 12/734,941, filed Jun. 2, 2010. The use of a process including a membrane separation step operated in sweep mode for treating natural gas combustion exhaust to remove carbon dioxide is taught in co-owned and copending U.S. patent application Ser. No. 13/122,136, filed Mar. 31, 2011.

SUMMARY OF THE INVENTION

Embodiments of the invention pertain to power generating processes. Membrane-based gas separation is used to control carbon dioxide emissions from combustion of methane-containing gases, such as natural gas, and methane gas combustion processes in which carbon dioxide emissions are produced. The invention includes processes for treating exhaust gases from combustion of burnable gas mixtures other than natural gas, such as syngas, refinery fuel gas, or blast furnace off-gas. Embodiments of the invention are applicable to both traditional and combined cycle turbine power generation processes.

Power plants generate enormous amounts of flue gas. For example, a modestly sized 100 megawatt power plant may produce over 300 MMscfd of exhaust (flue) gas.

The major components of combustion exhaust gases are normally nitrogen, carbon dioxide, and water vapor. Other components that may be present, typically only in small amounts, include oxygen, hydrogen, $SO_x$, $NO_x$, and unburnt hydrocarbons. Syngas may also contain heavy metals, such as mercury. The carbon dioxide concentration in the flue gas can be up to about 20 volume %, but in most power plants, the exhaust gas contains between 4-8% carbon dioxide. Separating the carbon dioxide from this very large dilute stream is complex. The processes described herein produce more concentrated and smaller exhaust streams. Downstream separation of concentrated carbon dioxide for sequestration or other uses is then much more economical.

In addition to gaseous components, combustion flue gas—depending on the fuel used—may contain suspended particulate matter in the form of fly ash and soot. This material is usually removed by several stages of filtration before the gas is sent to the stack. It is assumed herein that the flue gas has already been treated in this way, if desired, prior to carrying out the processes of the invention.

Embodiments of the invention involve treating the exhaust or flue gas to remove carbon dioxide into a small concentrate stream, while producing a second carbon dioxide-depleted exhaust stream. In preferred embodiments, the carbon dioxide level of the carbon dioxide-depleted exhaust gas is reduced to as low as 5 volume % or less, and most preferably, to 3 volume % or less, or even 2 volume % or less. Discharge of such a stream to the environment is much less damaging than discharge of the untreated exhaust.

The fuel gas may be combusted by mixing with air; oxygen-enriched air, or pure oxygen. Combustion of methane-containing gas often requires the gas being burnt to be mixed with a diluent gas—either before or after the combustor—to control the temperature of the gas going to the turbine. Typically, the diluent is excess air, steam, or nitrogen, or, as in embodiments of the present invention, it may be provided by partial recycling of the flue gas exhaust. In natural gas combustion, the volume of diluent may be equal or greater than the volume of air required for stoichiometric combustion of the gas.

The combustion step creates a combustor exhaust stream, which should preferably comprise at least 2 volume % oxygen. A portion of the combustor exhaust stream is then routed as at least a portion of a working gas stream to a gas turbine, to generate electrical power and create a turbine exhaust stream.

A first portion of the turbine exhaust stream is routed as a recycle gas stream back to the power generation process, either pre- or (preferably) post-combustion. When the recycle gas stream is routed back to the power generation process after the combustion step, it joins the combustor exhaust stream from the combustion step as part of the working gas stream to the gas turbine. The working gas stream to the gas turbine should preferably contain between about 1.5 to about 5 times excess oxygen-containing gas— most typically, between about 2 to about 3.5 times excess oxygen-containing gas—to decrease the temperature of the gas entering the turbine, to avoid melting or otherwise damaging turbine components. As used herein, the term "oxygen-containing gas" refers to any combination of a combined permeate/sweep stream (discussed below), a recycled exhaust gas stream, and/or an additional air, oxygen, or oxygen-enriched air supply stream, and the term "excess" refers to the excess volume over the stoichiometric volume of air needed for 100% combustion of fuel.

The purpose of the oxygen-containing gas is three-fold:
To combust the gaseous fuel;
To control the operating temperature of the combustor; and
To control the turbine temperature.

As such, the oxygen-containing gas must be present in a quantity large enough to meet all three purposes.

When the recycle gas stream is routed back to the power generation process prior to the combustion step, it joins the stream of oxygen-containing gas provided to the combustion step. The oxygen-containing gas provided to the combustion step should preferably comprise at least 15 volume % oxygen, to achieve complete combustion of the gaseous fuel.

Alternatively, one portion of the recycle gas stream may be routed back to the power generation process after the combustion step, and another portion of the recycle gas stream may be routed back after the combustion step.

A second portion of the turbine exhaust stream is withdrawn as a partially concentrated carbon dioxide product stream, which can then optionally be sent for further processing or sequestration, such as by absorption (such as amine scrubbing or chilled ammonia sorption), membrane separation, or condensation, by way of example and not by way of limitation.

A third portion of the turbine exhaust stream is routed to a sweep-based membrane separation step in a membrane module containing membranes that are selectively permeable to carbon dioxide over nitrogen and to carbon dioxide over oxygen. In this way, carbon dioxide that is in this stream is selectively removed as a permeate stream, which is recirculated back to the power generation process. The carbon dioxide-depleted exhaust (residue) stream is vented.

It is preferred that the membranes provide a carbon dioxide permeance of at least about 300 gpu, more preferably at least about 500 gpu, and most preferably at least about 1,000 gpu under the operating conditions of the process. High carbon dioxide permeances are needed to reduce the area of membrane needed to remove carbon dioxide from the exhaust gas. The membrane should also have a high carbon dioxide/oxygen selectivity to minimize oxygen permeation from the sweep gas stream into the exhaust gas stream. A carbon dioxide/oxygen selectivity of at least about 5, or more preferably 10, under the operating conditions of the process is desirable.

By using the oxygen-containing gas stream destined for the combustor as sweep gas, the membrane separation step is carried out in a very efficient manner, and without introducing any additional unwanted components into the combustion zone.

The process is particularly useful in applications that are energy-sensitive, as is almost always the case when very large streams from power plants are to be processed. The process is also particularly useful in separations that are pressure-ratio limited, as will be explained in more detail below.

The sweep-based membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements, as is well known in the art. Any number of membrane modules may be used.

The process may optionally be augmented by operating the membrane unit with higher total pressure on the feed side than on the permeate side, thereby increasing the transmembrane driving force for carbon dioxide permeation. The second portion of the exhaust stream may be sent to the membrane unit without compression, or may be compressed. Slight compression to a pressure from between about 1.5 bar up to about 5 bar, such as 2 bar, is preferred. The sweep stream preferably follows a sweep flow direction across the permeate side, the off-gas stream follows a feed flow direction across the feed side, and the sweep flow direction is substantially countercurrent to the feed flow direction. In the alternative, the relative flow directions may be substantially crosscurrent, or less preferred, cocurrent.

The residue stream from the sweep-based membrane separation step is reduced in carbon dioxide content to less than about 5 volume %, more preferably to less than 3 volume %, and most preferably to less than 2 volume %. This stream is typically, although not necessarily, discharged to the environment. The substantial reduction of the carbon dioxide content in the raw exhaust greatly reduces the environmental impact of discharging the stream.

An objective of the invention is to substantially increase the concentration of carbon dioxide in the carbon dioxide-rich exhaust stream from the power generation process, so that the portion of the exhaust stream that is withdrawn, and optionally sent for further processing or sequestration, can itself be concentrated and captured more efficiently than would otherwise be possible.

If the gas needs to be transported to reach the equipment that carries out the further processing, such as an amine or cryogenic plant, transportation of the partially concentrated carbon dioxide gas is far simpler and less costly than transporting low concentration raw flue gas from a conventional power plant. Typically, the amount of gas that must be pipelined or otherwise transported to the processing plant is reduced several fold, such as to 50%, 30%, or even 25% or less of the amount that would need to be sent if the membrane separation step were absent. This is a significant benefit of the invention.

The portion of the turbine exhaust stream that is recycled to the power generation process (i.e., the "first portion") preferably comprises between about 10 volume % and about 50 volume %, more preferably, between about 20 volume % and about 40 volume %, of the total turbine exhaust stream. The portion of the turbine exhaust stream that is withdrawn for optional further processing (i.e., the "second portion") preferably comprises between about 5 volume % and about 20 volume %, more preferably, between about 10 volume % and about 20 volume %, of the total turbine exhaust stream. The portion of the turbine exhaust stream that is to be sent to the sweep-based membrane separation step (i.e., the "third portion") preferably comprises between about 40 volume % and about 80 volume %, more preferably, between about 50 volume % and about 70 volume %, of the total turbine exhaust stream. These volume percentages can also be expressed as a split ratio, where the ratio defines the relative proportions of the turbine exhaust stream sent to each step. In general, we prefer to operate with a split ratio in the range of 3:1:6 (first portion:second portion:third portion).

Another objective of the invention is to minimize the amount of carbon dioxide in the residue stream from the sweep-based membrane separation step, which is often released to the environment. As such, the residue stream preferably comprises less than 5 volume % carbon dioxide; more preferably, less than 3 volume % carbon dioxide; and, most preferably, less than 2 volume % carbon dioxide. Most preferably, at least 80% of the carbon dioxide generated in the power generation process is recovered by the process of the invention. The substantial reduction of the carbon dioxide content in the raw exhaust greatly reduces the environmental impact of discharging the stream.

Accordingly, a basic embodiment of the invention as it relates to a traditional power generation process includes the following steps:

(a) performing a power generation process, comprising
(i) performing a combustion step by combusting a mixture comprising a gaseous fuel and an oxygen-containing gas, thereby generating a combustor exhaust stream comprising carbon dioxide and nitrogen, and (ii) routing the combustor exhaust stream as at least a portion of a working gas stream to a gas turbine, thereby generating electrical power and creating a turbine exhaust stream;

(b) routing a first portion of the turbine exhaust stream back to the power generation process as a recycle gas stream;

(c) withdrawing a second portion of the turbine exhaust stream as a partially concentrated carbon dioxide product stream;

(d) routing a third portion of the turbine exhaust stream to a sweep-based membrane separation step, wherein the sweep-based membrane separation step comprises (i) providing a membrane having a feed side and a permeate side, and being selectively permeable to carbon dioxide over nitrogen and to carbon dioxide over oxygen, (ii) passing a feed gas comprising the third portion of the turbine exhaust stream across the feed side, (iii) passing air, oxygen-enriched air, or oxygen as a sweep stream across the permeate side, (iv) withdrawing from the feed side a carbon dioxide-depleted stream, (v) withdrawing from the permeate side a permeate stream comprising oxygen and carbon dioxide; and (e) passing the permeate stream back to the power generation process.

Another embodiment of the invention relates to a combined cycle power generation process. This embodiment includes the following steps:

(a) performing a combined cycle power generation process, comprising (i) performing a combustion step by combusting a mixture comprising a gaseous fuel and an oxygen-containing gas, thereby generating a combustor exhaust stream comprising carbon dioxide and nitrogen, (ii) routing the combustor exhaust stream as at least a portion of a working gas stream to a gas turbine, thereby generating electrical power and creating a turbine exhaust stream, (iii) routing at least a portion of the turbine exhaust stream to a boiler, thereby generating steam and creating a boiler exhaust stream, and (iv) routing the steam to a steam turbine, thereby generating additional electrical power;

(b) routing a first portion of the boiler exhaust stream back to the power generation process as a recycle gas stream;

(c) withdrawing a second portion of the boiler exhaust stream as a partially concentrated carbon dioxide product stream;

(d) routing a third portion of the boiler exhaust stream to a sweep-based membrane separation step, wherein the sweep-based membrane separation step comprises (i) providing a membrane having a feed side and a permeate side, and being selectively permeable to carbon dioxide over nitrogen and to carbon dioxide over oxygen, (ii) passing a feed gas comprising the third portion of the boiler exhaust stream across the feed side, (iii) passing air, oxygen-enriched air, or oxygen as a sweep stream across the permeate side, (iv) withdrawing from the feed side a carbon dioxide-depleted stream, (v) withdrawing from the permeate side a permeate stream comprising oxygen and carbon dioxide; and (e) passing the permeate stream back to the power generation process.

In an alternative embodiment of the invention, the second portion of the turbine exhaust stream or (in the case of a combined cycle process, the boiler exhaust stream) is sent to a carbon dioxide capture step in a membrane module containing membranes that are selectively permeable to carbon dioxide over nitrogen and to carbon dioxide over oxygen, and having the properties described above with respect to the membranes used in the sweep-based membrane separation. The second portion of the turbine or boiler exhaust stream is flowed across the feed side of the membranes. A partially concentrated carbon dioxide product stream is then withdrawn from the permeate side of the membrane. This partially concentrated carbon dioxide stream can then be sent for further processing or sequestration, as described above.

A carbon dioxide-depleted stream is withdrawn from the feed side of the membrane unit. This carbon dioxide-depleted stream is then routed to the feed side of a membrane separation module that is adapted for operation in sweep mode. As discussed above, the feed gas flows across the feed side of the membranes, and a sweep gas of air, oxygen-enriched air, or oxygen flows across the permeate side, to provide or augment the driving force for transmembrane permeation. The sweep stream picks up the preferentially permeating carbon dioxide. The combined sweep/permeate stream is then withdrawn from the membrane unit and is returned to the power generation process.

The portion of the turbine exhaust stream or (in the case of a combined cycle process) boiler exhaust stream that is recycled to the power generation process (i.e., the "first portion") preferably comprises between about 10 volume % and about 50 volume %, more preferably, between about 20 volume % and about 40 volume %, of the total turbine exhaust stream. The portion of the turbine exhaust stream that is sent to the membrane-based carbon dioxide capture step (i.e., the "second portion") preferably comprises between about 50 volume % and about 90 volume %, more preferably, between about 60 volume % and about 80 volume %, of the total turbine exhaust stream. As discussed above, these volume percentages can also be expressed as a split ratio, where the ratio defines the relative proportions of the turbine exhaust stream sent to each step. In general, we prefer to operate with a split ratio in the range of 1:2 to about 1:3 (first portion:second portion).

Accordingly, a preferred embodiment of a process of the type described above includes the following steps:

(a) performing a power generation process, comprising (i) performing a combustion step by combusting a mixture comprising a gaseous fuel and an oxygen-containing gas, thereby generating a combustor exhaust stream comprising carbon dioxide and nitrogen, and (ii) routing the combustor exhaust stream as at least a portion of a working gas stream to a gas turbine, thereby generating electrical power and creating a turbine exhaust stream;

(b) routing a first portion of the turbine exhaust stream back to the power generation process as a recycle gas stream;

(c) routing a second portion of the turbine exhaust stream to a membrane-based carbon dioxide capture step, wherein the capture step comprises (i) providing a first membrane having a first feed side and a first permeate side, and being selectively permeable to carbon dioxide over nitrogen and to carbon dioxide over oxygen, (ii) passing the second portion of the turbine exhaust stream across the first feed side, (iii) withdrawing from the first permeate side a partially concentrated carbon dioxide product stream, (iv) withdrawing from the first feed side a carbon dioxide-depleted stream (d) routing the carbon dioxide-depleted stream to a sweep-based membrane separation step, wherein the sweep-based membrane separation step comprises (i) providing a second membrane having a second feed side and a second permeate side, and being selectively permeable to carbon dioxide over nitrogen and to carbon dioxide over oxygen, (ii) passing a feed gas comprising the carbon dioxide-depleted stream across the second feed side, (iii) passing air, oxygen-enriched air, or oxygen as a sweep stream across the second permeate side, (iv) withdrawing from the second feed side a stream that is depleted in carbon dioxide compared to the feed gas, (v) withdrawing from the second permeate side a permeate stream comprising oxygen and carbon dioxide; and (e) passing the permeate stream back to the power generation process.

A preferred embodiment of a process of the type described above as it pertains to a combined cycle power generation process includes the following steps:

(a) performing a combined cycle power generation process, comprising (i) performing a combustion step by combusting a mixture comprising a gaseous fuel and an oxygen-containing gas, thereby generating a combustor exhaust stream comprising carbon dioxide and nitrogen, (ii) routing the combustor exhaust stream as at least a portion of a working gas stream to a gas turbine, thereby generating electrical power and creating a turbine exhaust stream, (iii) routing at least a portion of the turbine exhaust stream to a boiler, thereby generating steam and a creating a boiler exhaust stream, and (iv) routing the steam to a steam turbine, thereby generating additional electrical power;

(b) routing a first portion of the boiler exhaust stream back to the power generation process as a recycle gas stream;

(c) routing a second portion of the boiler exhaust stream to a membrane-based carbon dioxide capture step, wherein the capture step comprises (i) providing a first membrane having a first feed side and a first permeate side, and being selectively permeable to carbon dioxide over nitrogen and to carbon dioxide over oxygen, (ii) passing the second portion of the boiler exhaust stream across the first feed side, (iii) withdrawing from the first permeate side a partially concentrated carbon dioxide product stream, (iv) withdrawing from the first feed side a carbon dioxide-depleted stream (d) routing the carbon dioxide-depleted stream to a sweep-based membrane separation step, wherein the sweep-based membrane separation step comprises (i) providing a second membrane having a second feed side and a second permeate side, and being selectively permeable to carbon dioxide over nitrogen and to carbon dioxide over oxygen, (ii) passing a feed gas comprising the carbon dioxide-depleted stream across the second feed side, (iii) passing air, oxygen-enriched air, or oxygen as a sweep stream across the second permeate side, (iv) withdrawing from the second feed side a stream that is depleted in carbon dioxide compared to the feed gas, (v) withdrawing from the second permeate side a permeate stream comprising oxygen and carbon dioxide; and (e) passing the permeate stream back to the power generation process.

Yet another embodiment of the invention, where a portion of the turbine exhaust stream is not recycled to the power generation process, includes the following steps:

(a) performing a power generation process, comprising (i) performing a combustion step by combusting a mixture comprising a gaseous fuel and an oxygen-containing gas, thereby generating a combustor exhaust stream comprising carbon dioxide and nitrogen, and (ii) routing the combustor exhaust stream as at least a portion of a working gas stream to a gas turbine, thereby generating electrical power and creating a turbine exhaust stream;

(b) routing at least a portion of the turbine exhaust stream to a membrane-based carbon dioxide capture step, wherein the capture step comprises (i) providing a first membrane having a first feed side and a first permeate side, and being selectively permeable to carbon dioxide over nitrogen and to carbon dioxide over oxygen, (ii) passing the at least a portion of the turbine exhaust stream across the first feed side, (iii) withdrawing from the first permeate side a partially concentrated carbon dioxide first permeate stream, (iv) withdrawing from the first feed side a carbon dioxide-depleted first residue stream;

(c) routing the first residue stream to a sweep-based membrane separation step, wherein the sweep-based membrane separation step comprises (i) providing a second membrane having a second feed side and a second permeate side, and being selectively permeable to carbon dioxide over nitrogen and to carbon dioxide over oxygen, (ii) passing the first residue stream across the second feed side, (iii) passing air, oxygen-enriched air, or oxygen as a sweep stream across the second permeate side, (iv) withdrawing from the second feed side a second residue stream that is depleted in carbon dioxide compared to the feed gas, (v) withdrawing from the second permeate side a second permeate stream comprising oxygen and carbon dioxide; and (d) passing the second permeate stream back to the power generation process.

An alternative embodiment of the invention pertains to a combined cycle power generation process, where a portion of the turbine exhaust stream is withdrawn at higher than atmospheric pressure. This process embodiment comprises the following steps:

(a) performing a combined cycle power generation process, comprising (i) performing a combustion step by combusting a mixture comprising a gaseous fuel and an oxygen-containing gas, thereby generating a combustor exhaust stream comprising carbon dioxide and nitrogen, (ii) routing the combustor exhaust stream as at least a portion of a working gas stream to a gas turbine, thereby generating electrical power and creating a turbine exhaust stream, (iii) withdrawing from the gas turbine a first portion of the turbine exhaust stream at a pressure higher than atmospheric pressure;

(iv) routing the first portion of the turbine exhaust stream to a boiler, thereby generating steam and creating a first boiler exhaust stream, (v) withdrawing from the gas turbine a second portion of the turbine exhaust stream at approximately atmospheric pressure;

(vi) routing the second portion of the turbine exhaust stream to a boiler, thereby generating steam and creating a second boiler exhaust stream, and (vii) routing the steam to a steam turbine, thereby generating additional electrical power;

(b) routing the second boiler exhaust stream back to the power generation process as a recycle gas stream;

(c) routing the first boiler exhaust stream to a membrane-based carbon dioxide capture step, wherein the capture step comprises (i) providing a first membrane having a first feed side and a first permeate side, and being selectively permeable to carbon dioxide over nitrogen and to carbon dioxide over oxygen, (ii) passing the first boiler exhaust stream across the first feed side, (iii) withdrawing from the first permeate side a partially concentrated carbon dioxide first permeate stream, (iv) withdrawing from the first feed side a carbon dioxide-depleted first residue stream;

(d) routing the first residue stream to a sweep-based membrane separation step, wherein the sweep-based membrane separation step comprises (i) providing a second membrane having a second feed side and a second permeate side, and being selectively permeable to carbon dioxide over nitrogen and to carbon dioxide over oxygen, (ii) passing the first residue stream across the second feed side, (iii) passing air, oxygen-enriched air, or oxygen as a sweep stream across the second permeate side, (iv) withdrawing from the second feed side a second residue stream that is depleted in carbon dioxide compared to the feed gas, (v) withdrawing from the second permeate side a second permeate stream comprising oxygen and carbon dioxide;

(e) passing the second permeate stream back to the power generation process; and (f) passing the second residue stream to an expander unit.

The first portion of the turbine exhaust stream is typically withdrawn at a pressure within the range of about 2 bar to about 5 bar.

DETAILED DESCRIPTION OF THE INVENTION

Gas percentages given herein are by volume unless stated otherwise.

Pressures as given herein are in bar absolute unless stated otherwise.

The terms exhaust gas, off-gas, flue gas, and emissions stream are used interchangeably herein.

The terms natural gas, syngas, and fuel are used interchangeably herein.

The invention is a process for controlling carbon dioxide emissions from combustion of gaseous fuels, such as natural gas or the like, by membrane-based gas separation, and gaseous fuel combustion processes including such gas separation. The process is expected to be particularly useful for treating flue or exhaust gas from gas-fired power plants, such as traditional or combined cycle plants, which typically use natural gas as fuel, and IGCC (Integrated Gasification Combined Cycle) plants, which use syngas, typically made by gasifying coal, as fuel.

In either a traditional plant or in a conventional combined cycle plant, it is common to dilute the mixture of gases in the combustion chamber by feeding an excess of air, such as twice the flow needed to satisfy the stoichiometric ratio for the combustion reactions. The excess air does not take part in the reactions, but dilutes the combustion gases, thereby moderating the exhaust gas temperature. As an alternative or in addition to feeding excess air, a portion of the exhaust gas itself is sometimes returned to the combustor as part of the oxygen-containing gas to the combustor. In some IGCC plants, where the gasifier uses an oxygen feed, nitrogen produced as a co-product of oxygen production is used as a diluent for the fuel gas being combusted.

In a traditional or combined cycle power plant, the gaseous fuel is combusted to produce a hot gas that is used to drive a gas turbine, producing power. The exhaust gas from the combustor is still very hot and so can be used to boil water, producing steam that can then drive a steam turbine in a combined cycle plant.

Figure 1A:
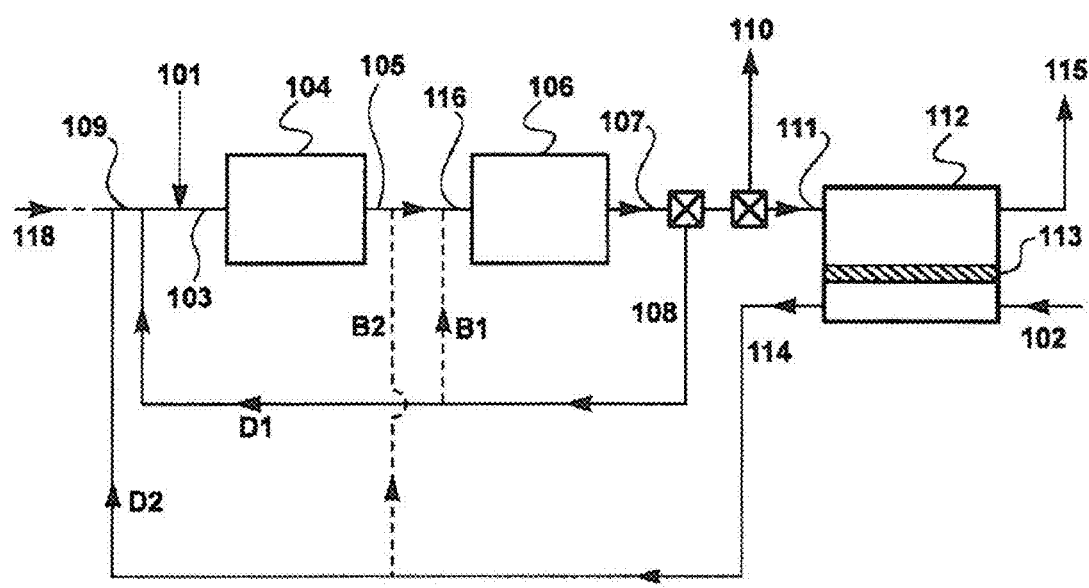
FIG. 1A is a schematic drawing of a flow scheme for a basic embodiment of the process of the invention as it relates to a traditional power generation process. The process includes recycling a portion of the carbon dioxide generated in the power generation process back to the power generation process, as well as a sweep-based membrane separation step.

A simple flow scheme for a basic embodiment of a power generation process in accordance with the invention, as it relates to a traditional power generation process, is shown in FIG. 1A. From FIG. 1A, it can be seen that a portion of the exhaust stream generated in the power generation process is routed back to the power generation process (either pre- or post-combustion), a portion of the exhaust stream is withdrawn (for optional further processing), and a portion is sent to a sweep-based membrane separation step.

Referring to FIG. 1A, fuel stream 101 and compressed oxygen-containing gas stream 109 are mixed and introduced as feed stream 103 into combustion step or zone 104. Optionally, fuel stream 101 and oxygen-containing gas stream 109 can be introduced as separate streams into combustion step 104.

Oxygen-containing gas stream 109 may be made up of one or more of the following three streams: diluent gas stream D1, diluent gas stream D2, and additional air, oxygen, or oxygen-enriched air stream 118. Diluent stream D1 originates from recycle stream 108; diluent stream D2 originates from combined permeate/sweep stream 114. Streams 108 and 114 will be discussed further in detail below.

Oxygen-containing gas stream 109 is typically compressed (compressor not shown in this figure) before being combined with fuel stream 101 (which is at pressure) and introduced into the combustor 104. The ratios of fuel 101 and oxygen-containing gas 109 may be adjusted as convenient in accordance with known combustion principles.

The combustion step 104 generates combustion exhaust stream 105, which preferably contains at least 15 volume %; more preferably, at least 20 volume %; and, most preferably, at least 25 volume %, carbon dioxide. This stream usually contains water vapor, nitrogen, and oxygen, in addition to the carbon dioxide. Combustion exhaust stream 105 is then routed to gas turbine 106, which generates electrical power and turbine exhaust stream 107.

In one embodiment, combustion exhaust stream 105 is combined with either one or both of optional bypass streams B1 and B2, which are typically compressed (compressor not shown in this figure) before being combined with exhaust stream 105 to provide turbine working gas stream 116. Bypass stream B1 originates from recycle stream 108; bypass stream B2 originates from combined permeate/sweep stream 114.

The invention embodiment described in the paragraph above is generally less preferred with respect to existing power plants, because it requires a second compressor train (not shown in this figure). Most existing plants only have one compressor train, situated upfront of the combustor to compress the oxygen-containing stream to the combustor. However, future power plants may be built with two compressor trains, in which case, this process embodiment, in which either or both of the recycle stream 108 and the combined permeate/sweep stream 114 are recycled to the power generation process post-combustion, may be preferred.

Those skilled in the art will realize that changing the feed gas composition to the turbine air compressor may affect the turbine's efficiency and power output. In existing equipment, some changes to the turbine and combustor may be required to handle these changes. New machines would be built with modified compressor and combustor units designed to handle the differing gas compositions and achieve maximum efficiency.

Turbine exhaust stream 107 is then typically cooled to knock out water. Turbine exhaust stream 107 is then divided in a desired ratio into three portions: a first portion 108 to be recycled back to the power generation process; a second portion 110 to be withdrawn for optional further processing; and a third portion 111 to be sent to a sweep-based membrane separation step.

The first portion 108 of turbine exhaust stream 107 is routed back to the power generation process, either prior to the combustion step 104 as diluent stream D1, or after the combustion step, but prior to the gas turbine 106, as bypass stream B1, where it is combined with combustion exhaust stream 105 (and, optionally, with bypass stream B2) to form turbine working gas stream 116. Optionally, one portion of stream 108 can be sent back to the power generation process pre-combustion as diluent stream D1, and another portion can be sent to the power generation process post-combustion as bypass stream B1.

A second portion 110 of turbine exhaust stream 107 is withdrawn as a partially concentrated carbon dioxide product stream, which can then optionally be sent for further processing or sequestration, such as by absorption (such as amine scrubbing or chilled ammonia sorption), membrane separation, or condensation, by way of example and not by way of limitation.

A third portion 111 of turbine exhaust stream 107 is sent for treatment in sweep-based membrane separation step or unit 112. The membrane separation unit 112 contains membranes 113 that exhibit high permeance for carbon dioxide, as well as high selectivity for carbon dioxide over nitrogen and oxygen.

Any membranes with suitable performance properties may be used. Many polymeric materials, especially polar elastomeric materials, are very permeable to carbon dioxide. Preferred membranes for separating carbon dioxide from nitrogen or other inert gases have a selective layer based on a polyether. A number of membranes are known to have high carbon dioxide/nitrogen selectivity, such as 30, 40, 50, or above, and carbon dioxide/oxygen selectivity of 10, 15, 20, or above (although the selectivity may be lower under actual operating conditions). A representative preferred material for the selective layer is Pebax®, a polyamide-polyether block copolymer material described in detail in U.S. Pat. No. 4,963,165. We have found that membranes using Pebax® as the selective polymer can maintain a carbon dioxide/nitrogen selectivity of 20 or greater under process conditions.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules, and potted hollow-fiber modules. The making of all these types of membranes and modules is well known in the art. To provide countercurrent flow of the sweep gas stream, the modules preferably take the form of hollow-fiber modules, plate-and-frame modules, or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 112 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multistage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

Although the membrane modules are typically arranged horizontally, a vertical configuration may in some cases be preferred to reduce the risk of deposition of particulates on the membrane feed surface.

The separation of components achieved by the membrane unit depends not only on the selectivity of the membrane for the components to be separated, but also on the pressure ratio. By pressure ratio, we mean the ratio of total feed pressure/total permeate pressure. In pressure driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure ratio-limited. For example, a process in which a membrane selectivity of 40, 50, or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 102, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate to a level below its partial pressure on the feed side. The use of the sweep gas stream 102 maintains a low carbon dioxide partial pressure on the permeate side, thereby providing driving force.

The partial pressure on the permeate side may be controlled by adjusting the flow rate of the sweep stream to a desired value. In principle, the ratio of sweep gas flow to feed gas flow may be any value that provides the desired results, although the ratio sweep gas flow:feed gas flow will seldom be less than 0.5 or greater than 2. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a sweep rate that is too low may provide insufficient driving force for a good separation, and use of an overly high sweep flow rate may lead to pressure drop or other problems on the permeate side, or may adversely affect the stoichiometry in the reaction vessel. Typically and preferably, the flow rate of the sweep stream should be between about 50% and 300% of the flow rate of the membrane feed stream; more preferably, between about 80% and 200%; and, most preferably, between about 80% and 150%.

The total gas pressures on each side of the membrane may be the same or different, and each may be above or below atmospheric pressure. As mentioned above, if the pressures are about the same, the entire driving force is provided by the sweep mode operation.

In many cases, however, flue gas is available at atmospheric pressure, and the volumes of the streams involved are so large that it is not preferred to use either significant compression on the feed side or vacuum on the permeate side. However, slight compression, such as from atmospheric to a few bar, such as 1.5, 2, 3, 4, or 5 bar, for example, can be helpful and can provide part of a total carbon dioxide capture and recovery process that is relatively energy efficient, as shown in the examples below. Further, if the combustion step is performed at high pressure, such as at 20 bar or 30 bar, as in a combined cycle plant, for example, then process designs that involve compressing the exhaust gas to higher pressures can be contemplated. These designs enable the portion of gas sent to the carbon dioxide capture step to be sent at pressure, and enable the membrane separation step to be operated with a relatively high pressure on the permeate side, thereby reducing the amount of compression needed before the permeate/sweep stream enters the combustor.

Returning to FIG. 1A, the third portion 111 of turbine exhaust stream 107 flows across the feed side of the membranes 113; a sweep gas of air, oxygen-enriched air, or oxygen stream 102, flows across the permeate side. The sweep stream 102 picks up the preferentially permeating carbon dioxide, and the resulting combined permeate/sweep stream 114 is withdrawn from the membrane unit and is sent back to the power generation process as either one or both of diluent stream D2 and bypass stream B2.

Diluent stream D2 may be combined with optional diluent stream D1 and/or optional additional air or oxygen supply stream 118, then compressed (compressor not shown in this figure) to form oxygen-containing gas stream 109, which is combined with fuel stream 101 to form feed stream 103 to the combustor 104. In the alternative, if post-, rather than pre-, combustion recycle is desired (which may require the presence of a second compressor train), diluent streams D1 and D2 may be omitted, and the entirety of the oxygen-containing gas stream 109 to the combustor 104 may be provided by air stream 118.

An additional benefit of using the combustion oxygen-containing gas supply as the permeate sweep is that the permeating carbon dioxide removed into the sweep gas is recycled to the combustion chamber. This increases the carbon dioxide concentration in the exhaust gas leaving the combustor, facilitating the downstream capture of carbon dioxide.

The residue stream 115 resulting from the sweep-based membrane separation step 112 is reduced in carbon dioxide content to less than about 5 volume %; more preferably, to less than 3 volume %; and, most preferably, to less than 2 volume %. The residue stream 115 is typically discharged to the environment as treated flue gas.

The proportions of the flue gas that are directed to the recycle step 108, the withdrawal step 110, and the sweep-based membrane separation step 112 may be adjusted in conjunction with other operating parameters to tailor the processes of the invention to specific circumstances.

One of the goals of the process is to increase the carbon dioxide concentration in the feed stream to the withdrawal step, because many carbon dioxide separation technologies, such as amine scrubbing and cryogenic condensation, have capital and/or operating costs that scale with the concentration of the component to be captured. The membrane separation step preferentially permeates carbon dioxide and returns it to the combustor, thereby forming a loop between the combustor and the membrane unit in which the carbon dioxide concentration can build up.

The more exhaust gas that is directed to the membrane unit, the greater is the potential to increase the carbon dioxide concentration in the loop. However, the amount of membrane area needed will increase in proportion to the volume flow of gas directed to the membrane unit. Furthermore, most membrane materials have slight selectivity for oxygen over nitrogen, so a little oxygen from the air sweep stream will tend to counter-permeate to the feed side of the membranes and be lost in the residue stream. Consequently, the concentration of oxygen in the combustor may drop, giving rise to the possibility of incomplete combustion or other problems. As an indication that the combustion step is still being provided with an adequate supply of oxygen, we prefer the process to be operated so as to provide an oxygen concentration of at least about 3 volume % in the exhaust gas stream 105 from the turbine (based on the composition after water removal).

The portion of the turbine exhaust stream that is recycled to the power generation process (i.e., the "first portion") preferably comprises between about 10 volume % and about 50 volume %, more preferably, between about 20 volume % and about 40 volume %, of the total turbine exhaust stream. The portion of the turbine exhaust stream that is withdrawn for optional further processing (i.e., the "second portion") preferably comprises between about 5 volume % and about 20 volume %, more preferably, between about 10 volume % and about 20 volume %, of the total turbine exhaust stream. The portion of the turbine exhaust stream that is to be sent to the sweep-based membrane separation step (i.e., the "third portion") preferably comprises between about 40 volume % and about 80 volume %, more preferably, between about 50 volume % and about 70 volume %, of the total turbine exhaust stream. These volume percentages can also be expressed as a split ratio, where the ratio defines the relative proportions of the turbine exhaust stream sent to each step. In general, we prefer to operate with a split ratio in the range of 3:1:6 (first portion:second portion:third portion).

Figure 1B:
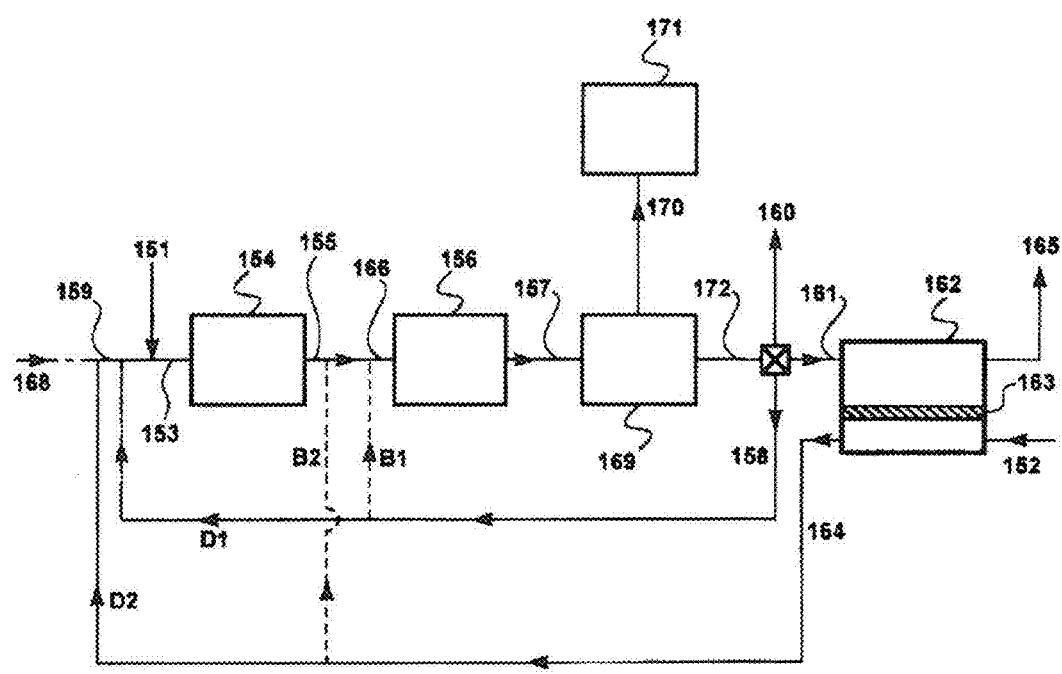
FIG. 1B is a schematic drawing of a flow scheme for a basic embodiment of the process of the invention as it relates to a combined cycle power generation process.

A simple flow scheme for a basic embodiment of a power generation process in accordance with the invention, as it relates to a combined cycle power generation process, is shown in FIG. 1B.

Referring to FIG. 1B, fuel stream 151 and compressed oxygen-containing gas stream 159 are mixed and introduced as feed stream 153 into combustion step or zone 154. Optionally, fuel stream 151 and oxygen-containing gas stream 159 can be introduced as separate streams into combustion step 154.

Oxygen-containing gas stream 159 may be made up of one or more of the following three streams: diluent gas stream D1, diluent gas stream D2, and additional air, oxygen, or oxygen-enriched air stream 168. Diluent stream D1 originates from recycle stream 158; diluent stream D2 originates from combined permeate/sweep stream 164 (as described above, with respect to the invention embodiment described in the previous paragraphs).

Oxygen-containing gas stream 159 is typically compressed (compressor not shown in this figure) before being combined with fuel stream 151 (which is at pressure) and introduced into the combustor 154. The ratios of fuel 151 and oxygen-containing gas 159 may be adjusted as convenient in accordance with known combustion principles, such as to meet the temperature control needs of a combined cycle operation.

The combustion step 154 generates combustion exhaust stream 155, which preferably contains at least 15 volume %; more preferably, at least 20 volume %; and, most preferably, at least 25 volume %, carbon dioxide. This stream usually contains water vapor, nitrogen, and oxygen, in addition to the carbon dioxide. Combustion exhaust stream 155 is then routed to gas turbine 156, which generates electrical power and turbine exhaust stream 157.

In one embodiment, combustion exhaust stream 155 is combined with either one or both of optional bypass streams B1 and B2, which are typically compressed (compressor not shown in this figure) before being combined with exhaust stream 155 to provide turbine working gas stream 166. Bypass stream B1 originates from recycle stream 158; bypass stream B2 originates from combined permeate/sweep stream 164.

In accordance with a combined cycle process, turbine exhaust stream 157 is then routed to a boiler 169 to generate steam 170, which is routed to a steam turbine 171 to produce additional electrical power.

The exhaust stream 172 from boiler 169 is then typically cooled to knock out water. Boiler exhaust stream 172 is then divided in a desired ratio into three portions: a first portion 158 to be recycled back to the power generation process; a second portion 160 to be withdrawn for optional further processing; and a third portion 161 to be sent to a sweep-based membrane separation step.

The first portion 158 of boiler exhaust stream 172 is routed back to the power generation process, either prior to the combustion step 154 as diluent stream D1, or after the combustion step, but prior to the gas turbine 156, as bypass stream B1, where it is combined with combustion exhaust stream 155 (and, optionally, with bypass stream B2) to form turbine working gas stream 166. Optionally, one portion of stream 158 can be sent back to the power generation process pre-combustion as diluent stream D1, and another portion can be sent to the power generation process post-combustion as bypass stream B1.

A second portion 160 of boiler exhaust stream 172 is withdrawn as a partially concentrated carbon dioxide product stream, which can then optionally be sent for further processing or sequestration, such as by absorption (such as amine scrubbing or chilled ammonia sorption), membrane separation, or condensation, by way of example and not by way of limitation.

A third portion 161 of boiler exhaust stream 172 is sent for treatment in sweep-based membrane separation step or unit 162. The membrane separation unit 162 contains membranes 163 that exhibit the properties described above with respect to the basic embodiment of the invention depicted in FIG. 1A.

The third portion 161 of boiler exhaust stream 172 flows across the feed side of the membranes 163; a sweep gas of air, oxygen-enriched air, or oxygen stream 152, flows across the permeate side. The sweep stream 152 picks up the preferentially permeating carbon dioxide, and the resulting combined permeate/sweep stream 164 is withdrawn from the membrane unit and is sent back to the power generation process as either one or both of diluent stream D2 and bypass stream B2.

Diluent stream D2 may be combined with optional diluent stream D1 and/or optional additional air or oxygen supply stream 168, then compressed (compressor not shown in this figure) to form oxygen-containing gas stream 159, which is combined with fuel stream 151 to form feed stream 153 to the combustor 154. In the alternative, if post-, rather than pre-, combustion recycle is desired (which may require the presence of a second compressor train), diluent streams D1 and D2 may be omitted, and the entirety of the oxygen-containing gas stream 159 to the combustor 154 may be provided by air stream 168.

The residue stream 165 resulting from the sweep-based membrane separation step 162 is reduced in carbon dioxide content to less than about 5 volume %; more preferably, to less than 3 volume %; and, most preferably, to less than 2 volume %. The residue stream 165 is typically discharged to the environment as treated flue gas.

The proportions of the flue gas that are directed to the recycle step 158, the withdrawal step 160, and the sweep-based membrane separation step 162 may be adjusted in conjunction with other operating parameters to tailor the processes of the invention to specific circumstances, as discussed above with respect to the invention embodiment depicted in FIG. 1A.

Figure 1C:
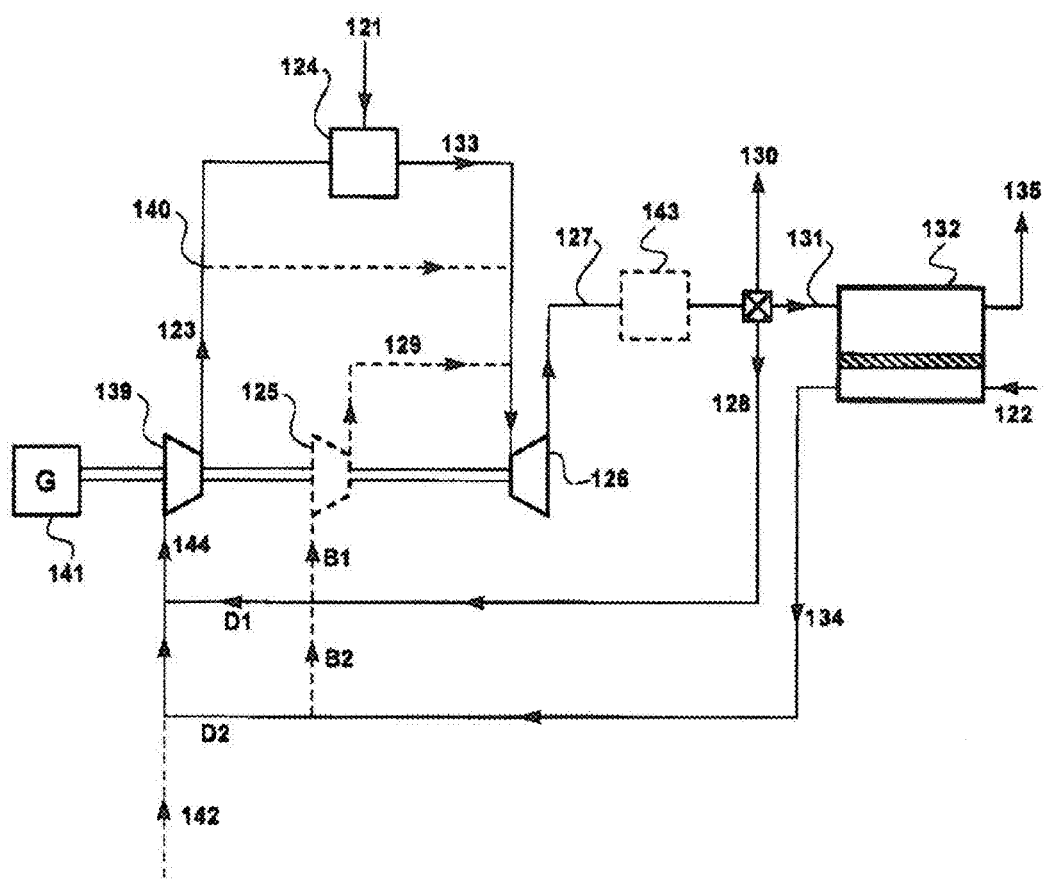
FIG. 1C is a more detailed drawing of a flow scheme for the process embodiment shown in FIG. 1B.

FIG. 1C is a more detailed drawing of a flow scheme for an embodiment of the process of the invention. Referring to FIG. 1C, an incoming oxygen-containing gas stream 144 is compressed from atmospheric pressure in an air compressor unit 139. Stream 144 is made up of diluent stream D1, diluent stream D2, and/or additional air or oxygen supply stream 142. Diluent stream D1 originates from recycle stream 128; diluent stream D2 originates from combined sweep/permeate stream 134.

The resulting compressed gas stream 123 is then combusted with the incoming fuel gas 121 in combustor 124. The hot, high-pressure gas 133 from the combustor 121 is then expanded through the gas turbine 126. The gas turbine 126 is mechanically linked to the air compressor 139 and an electrical power generator 141. The low-pressure exhaust gas exhaust gas 127 from the gas turbine 126 is still hot, so the energy content from this gas can optionally be recovered in a steam boiler 143 which, in a combined cycle operation, is used to make additional electricity in a secondary steam turbine.

A first portion 128 of turbine exhaust stream 127 is routed back to the power generation process, either through compressor 139 as diluent stream D1, or through a second, optional compressor 125 as bypass stream B1. Bypass stream B1 is compressed, then routed as gas stream 129 to gas turbine 126. Optionally, diluent stream D1 can be combined with diluent stream D2 and optional air stream 142 to form stream 144, which is compressed as stream 123, a portion 140 of which can then be routed to gas turbine 126. If it is to be routed back pre-combustion, diluent stream D1 is combined with diluent stream D2 and optional air stream 142 to form stream 144, which is compressed as stream 123 and sent directly to combustor 124.

A second portion 130 of turbine exhaust stream 127 is withdrawn as a partially concentrated carbon dioxide product stream, which can then optionally be sent for further processing or sequestration, such as by absorption (such as amine scrubbing or chilled ammonia sorption), membrane separation, or condensation, by way of example and not by way of limitation.

A third portion 131 of turbine exhaust stream 127 is sent for treatment in sweep-based membrane separation step or unit 132. A sweep gas of air, oxygen-enriched air, or oxygen stream 122 picks up the preferentially permeating carbon dioxide, and the resulting combined permeate/sweep stream 134 is withdrawn from the membrane unit and is sent back to the power generation process as either one or both of diluent stream D2 and bypass stream B2. Residue stream 135 is withdrawn and typically released to the environment.

As discussed above, in a traditional combustion process, air, oxygen-enriched air, or oxygen is often used as the sweep stream 122 to membrane unit 132. However, in an IGCC operation, nitrogen may be used as the sweep stream 122. In this case, combined permeate/sweep stream 134 is routed back to second compressor 125 as bypass stream B2, which is compressed and then routed as stream 129 to gas turbine 126. The entire volume of air flow to the first compressor 139 is then provided by air stream 142, which is compressed and routed as stream 123 to combustor 124.

Diluent stream D2 may be combined with diluent stream D1 and/or optional additional air or oxygen supply stream 142 to form oxygen-containing gas stream 144 to first compressor 139. Optionally, a portion of permeate/sweep stream 134 can be sent as bypass stream B2, which may be combined with bypass stream B1 and sent to optional second compressor 125 and back to the power generation process post-combustion.

Mixing compressed recycle gas 129 with the exhaust gas 133 from combustor 124 is often a preferred way of operating the system. Stream 129 will generally have a high carbon dioxide content, but a relatively low oxygen content. If the gas is mixed with the feed air to the combustor, the resulting mixture may have a relatively low oxygen concentration, containing less than 20%, and possibly less than 15% oxygen, or even less. Complete combustion of the fuel gas 121 in the combustor 124 may then not occur, or the flame produced in the combustor may not be stable.

Figure 2A:
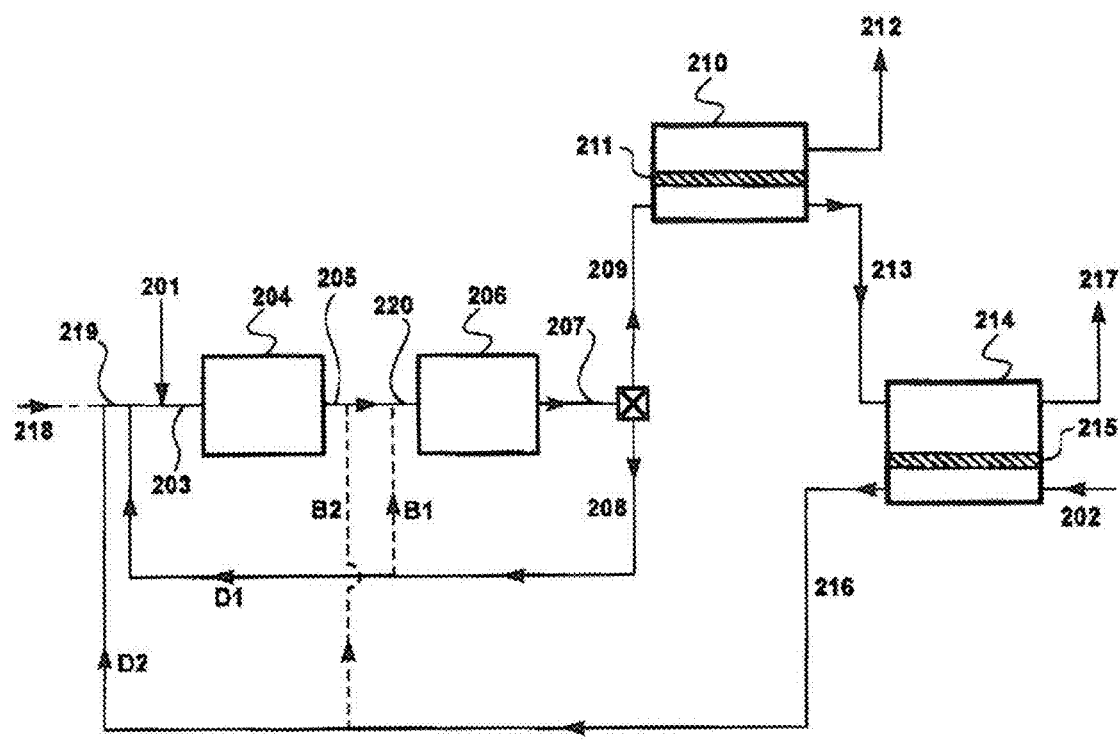
FIG. 2A is a schematic drawing of a flow scheme for a preferred embodiment of the process of the invention as it relates to a traditional power generation process. This process further includes a membrane-based carbon dioxide capture step prior to the sweep-based membrane separation step.

An alternative embodiment of the invention, in which a membrane-based carbon dioxide capture step is performed in advance of the sweep-based separation step, is illustrated schematically in FIG. 2A. The flow scheme depicted in FIG. 2A is for a traditional power generation process.

Referring to FIG. 2A, fuel stream 201 and compressed oxygen-containing gas stream 219 are mixed and introduced as feed stream 203 into combustion step or zone 204. Optionally, fuel stream 201 and oxygen-containing gas stream 219 can be introduced as separate streams into combustion step 204.

Oxygen-containing gas stream 219 may be made up of one or more of the following three streams: diluent gas stream D1, diluent gas stream D2, and additional air, oxygen, or oxygen-containing air stream 218. Diluent stream D1 originates from recycle stream 208; diluent stream D2 originates from combined permeate/sweep stream 216.

Oxygen-containing gas stream 219 is typically compressed (compressor not shown in this figure) before being combined with fuel stream 201 (which is at pressure) and introduced into the combustor 204. The ratios of fuel 201 and oxygen-containing gas 219 may be adjusted as convenient in accordance with known combustion principles.

The combustion step 204 generates combustion exhaust stream 205, which preferably contains at least 15 volume %; more preferably, at least 20 volume %; and, most preferably, at least 25 volume %, carbon dioxide. This stream usually contains water vapor, nitrogen, and oxygen, in addition to the carbon dioxide. Combustion exhaust stream 205 is then routed to gas turbine 206, which generates electrical power and turbine exhaust stream 207.

In one embodiment, combustion exhaust stream 205 is combined with either one or both of optional bypass streams B1 and B2, which are typically compressed (compressor not shown in this figure) before being combined with exhaust stream 205 to provide turbine working gas stream 220. Bypass stream B1 originates from recycle stream 208; bypass stream B2 originates from combined permeate/sweep stream 216.

Turbine exhaust stream 207 is then typically condensed to knock out water. Turbine exhaust stream 207 is then divided in a desired ratio into two portions: a first portion 208 to be recycled back to the power generation process, and a second portion 209 to be sent to a membrane-based carbon dioxide capture step 210.

The first portion 208 of turbine exhaust stream 207 is routed back to the power generation process, either prior to the combustion step 204 as diluent stream D1, or after the combustion step 204, but prior to the gas turbine 206, as bypass stream B1, where it is combined with combustion exhaust stream 205 (and, optionally, with bypass stream B2) to form turbine working gas stream 220. Optionally, one portion of stream 208 can be sent back to the power generation process pre-combustion as diluent stream D1, and another portion can be sent to the power generation process post-combustion as bypass stream B1.

A second portion 209 of turbine exhaust stream 207 is sent to a carbon dioxide capture step in a membrane module 210 containing membranes 211 that are selectively permeable to carbon dioxide over nitrogen and to carbon dioxide over oxygen, and having the properties described above with respect to the membranes used in the sweep-based membrane separation step in the invention embodiment depicted schematically in FIG. 1A.

The second portion 209 of turbine exhaust stream 207 is flowed across the feed side of the membranes 211. A partially concentrated carbon dioxide product stream 212 is then withdrawn from the permeate side of the membrane 211.

A carbon dioxide-depleted stream 213 is withdrawn from the feed side of the membrane unit 210. This carbon dioxide-depleted stream 213 is then routed to the feed side of a membrane separation module 214 that is adapted to be operated in sweep mode. Membrane module 214 contains membranes 215 that are selectively permeable to carbon dioxide over nitrogen and to carbon dioxide over oxygen, and having the properties described above with respect to the membranes used in the sweep-based membrane separation step in the invention embodiment depicted schematically in FIG. 1A.

As discussed above, the feed gas 213 flows across the feed side of the membranes 215, and a sweep gas 202 of air, oxygen-enriched air, or oxygen flows across the permeate side, to provide or augment the driving force for transmembrane permeation. The sweep stream 202 picks up the preferentially permeating carbon dioxide, and the resulting combined permeate/sweep stream 216 is withdrawn from the membrane unit and is sent back to the power generation process as either one or both of diluent stream D2 and bypass stream B2.

Diluent stream D2 may be combined with optional diluent stream D1 and/or optional additional air or oxygen supply stream 218, then compressed (compressor not shown in this figure) to form oxygen-containing gas stream 219, which is combined with fuel stream 201 to form feed stream 203 to the combustor 204. In the alternative, if post-, rather than pre-, combustion recycle is desired (which may require the presence of a second compressor train), diluent streams D1 and D2 may be omitted, and the entirety of the oxygen-containing gas stream 219 to the combustor 204 may be provided by air stream 218.

The residue stream 217 resulting from the sweep-based membrane separation step 214 is reduced in carbon dioxide content to less than about 5 volume %; more preferably, to less than 3 volume %; and, most preferably, to less than 2 volume %. The residue stream 214 is typically discharged to the environment as treated flue gas.

The proportions of the flue gas that are directed to the recycle step 208 and the membrane steps 210/214 may be adjusted in conjunction with other operating parameters to tailor the processes of the invention to specific circumstances. With respect to this embodiment of the invention, we believe that it is preferable to operate the process with a split ratio of between 1:2 and 1:3 (recycle:membrane). A split ratio of 1:2 means that 33 volume % is directed to the recycle step and 67 volume % to the membrane steps. In the 1:3 case, 25 volume. % passes to the recycle step and 75 volume % passes to the membrane steps.

Figure 2B:
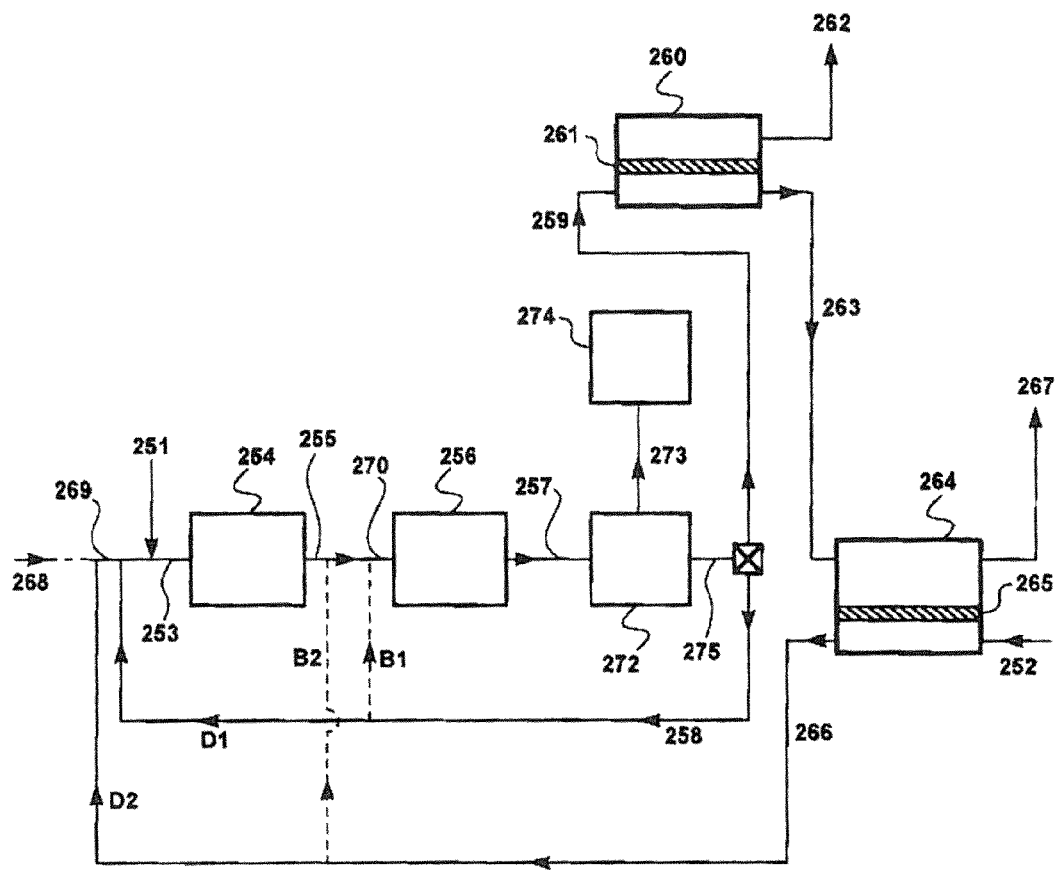
FIG. 2B is a schematic drawing of a flow scheme for a preferred embodiment of the process of the invention as it relates to a combined cycle power generation process.

A simple flow scheme for a preferred embodiment of a power generation process in accordance with the invention, as it relates to a combined cycle power generation process, is shown in FIG. 2B.

Referring to FIG. 2B, fuel stream 251 and compressed oxygen-containing gas stream 269 are mixed and introduced as feed stream 253 into combustion step or zone 254. Optionally, fuel stream 251 and oxygen-containing gas stream 269 can be introduced as separate streams into combustion step 254.

Oxygen-containing gas stream 269 may be made up of one or more of the following three streams: diluent gas stream D1, diluent gas stream D2, and additional air, oxygen, or oxygen-containing air stream 268. Diluent stream D1 originates from recycle stream 258; diluent stream D2 originates from combined permeate/sweep stream 266.

Oxygen-containing gas stream 269 is typically compressed (compressor not shown in this figure) before being combined with fuel stream 251 (which is at pressure) and introduced into the combustor 254. The ratios of fuel 251 and oxygen-containing gas 269 may be adjusted as convenient in accordance with known combustion principles, such as to meet the temperature control needs of a combined cycle operation, as mentioned above.

The combustion step 254 generates combustion exhaust stream 255, which preferably contains at least 15 volume %; more preferably, at least 20 volume %; and, most preferably, at least 25 volume %, carbon dioxide. This stream usually contains water vapor, nitrogen, and oxygen, in addition to the carbon dioxide. Combustion exhaust stream 255 is then routed to gas turbine 256, which generates electrical power and turbine exhaust stream 257.

In one embodiment, combustion exhaust stream 255 is combined with either one or both of optional bypass streams B1 and B2, which are typically compressed (compressor not shown in this figure) before being combined with exhaust stream 255 to provide turbine working gas stream 270. Bypass stream originates from recycle stream 258; bypass stream B2 originates from combined permeate/sweep stream 266.

In accordance with a combined cycle process, turbine exhaust stream 257 is then routed to a boiler 272 to generate steam 273, which is routed to a steam turbine 274 to produce additional electrical power.

The exhaust stream 275 from boiler 272 is then typically cooled to knock out water. Boiler exhaust stream 275 is then divided in a desired ratio into two portions: a first portion 258 to be recycled back to the power generation process, and a second portion 259 to be sent to a membrane-based carbon dioxide capture step 260.

The first portion 258 of boiler exhaust stream 275 is routed back to the power generation process, either prior to the combustion step 254 as diluent stream D1, or after the combustion step, but prior to the gas turbine 256, as bypass stream B1, where it is combined with combustion exhaust stream 255 (and, optionally, with bypass stream B2) to form turbine working gas stream 270. Optionally, one portion of stream 258 can be sent back to the power generation process pre-combustion as diluent stream D1, and another portion can be sent to the power generation process post-combustion as bypass stream B1.

A second portion 259 of boiler exhaust stream 275 is sent to a carbon dioxide capture step in a membrane module 260 containing membranes 261 that are selectively permeable to carbon dioxide over nitrogen and to carbon dioxide over oxygen, and having the properties described above with respect to the membranes used in the sweep-based membrane separation step in the invention embodiment depicted schematically in FIG. 1A.

The second portion 259 of boiler exhaust stream 275 is flowed across the feed side of the membranes 261. A partially concentrated carbon dioxide product stream 262 is then withdrawn from the permeate side of the membrane 261

A carbon dioxide-depleted stream 263 is withdrawn from the feed side of the membrane unit 260. This carbon dioxide-depleted stream 263 is then routed to the feed side of a membrane separation module 264 that is adapted to operate in sweep mode. Membrane module 264 contains membranes 265 that are selectively permeable to carbon dioxide over nitrogen and to carbon dioxide over oxygen, and having the properties described above with respect to the membranes used in the sweep-based membrane separation step in the invention embodiment depicted schematically in FIG. 1A.

As discussed above, the feed gas 263 flows across the feed side of the membranes 265, and a sweep gas 252 of air, oxygen-enriched air, or oxygen flows across the permeate side, to provide or augment the driving force for transmembrane permeation. The sweep stream 252 picks up the preferentially permeating carbon dioxide, and the resulting combined permeate/sweep stream 266 is withdrawn from the membrane unit and is sent back to the power generation process as either one or both of diluent stream D2 and bypass stream B2.

Diluent stream D2 may be combined with optional diluent stream D1 and/or optional additional air or oxygen supply stream 268, then compressed (compressor not shown in this figure) to form oxygen-containing gas stream 269, which is combined with fuel stream 251 to form feed stream 253 to the combustor 254. In the alternative, if post-, rather than pre-, combustion recycle is desired (which may require the presence of a second compressor train), diluent streams D1 and D2 may be omitted, and the entirety of the oxygen-containing gas stream 269 to the combustor 254 may be provided by air stream 268.

The residue stream 267 resulting from the sweep-based membrane separation step 264 is reduced in carbon dioxide content to less than about 5 volume %; more preferably, to less than 3 volume %; and, most preferably, to less than 2 volume %. The residue stream 264 is typically discharged to the environment as treated flue gas.

The proportions of the flue gas that are directed to the recycle step 258 and the membrane steps 260/264 may be adjusted in conjunction with other operating parameters to tailor the processes of the invention to specific circumstances, as discussed above with respect to the invention embodiment depicted in FIG. 2A.

Figure 7:
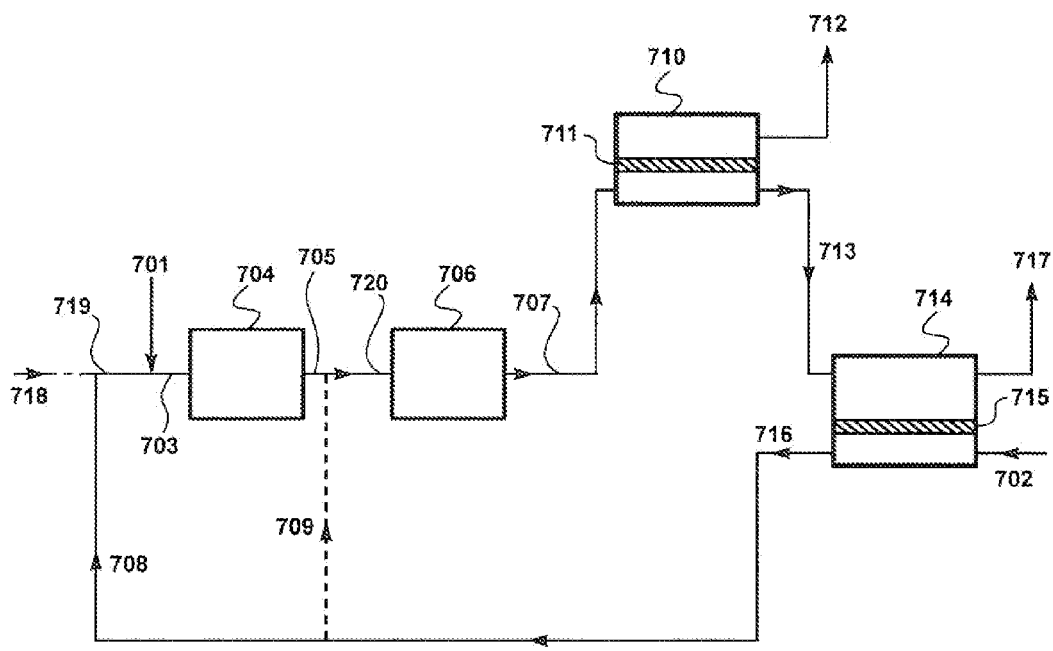
FIG. 7 is a schematic drawing of a flow scheme for a power generation process where a portion of the turbine exhaust stream is not recycled to the power generation process.

Yet another embodiment of the invention, where a portion of the turbine exhaust stream is not recycled to the power generation process, is illustrated schematically in FIG. 7. The flow scheme depicted in FIG. 7 is for a traditional power generation process.

Referring to FIG. 7, fuel stream 701 and compressed oxygen-containing gas stream 719 are mixed and introduced as feed stream 703 into combustion step or zone 704. Optionally, fuel stream 701 and oxygen-containing gas stream 719 can be introduced as separate streams into combustion step 704.

Oxygen-containing gas stream 719 may be made up of one or more of diluent gas stream 708 and additional air, oxygen, or oxygen-containing air stream 718. Diluent stream 708 originates from combined permeate/sweep stream 716.

Oxygen-containing gas stream 719 is typically compressed (compressor not shown in this figure) before being combined with fuel stream 701 (which is at pressure) and introduced into combustion step 704. The ratios of fuel 701 and oxygen-containing gas 719 may be adjusted as convenient in accordance with known combustion principles.

The combustion step 704 generates combustion exhaust stream 705, which preferably contains at least 15 volume %; more preferably, at least 20 volume %; and, most preferably, at least 25 volume %, carbon dioxide. This stream usually contains water vapor, nitrogen, and oxygen, in addition to the carbon dioxide. Combustion exhaust stream 705 is then routed to gas turbine 706, which generates electrical power and turbine exhaust stream 707.

In one embodiment, combustion exhaust stream 705 is combined with optional bypass stream 709, which is typically compressed (compressor not shown in this figure) before being combined with exhaust stream 705 to provide turbine working gas stream 720. Bypass stream 709 originates from combined permeate/sweep stream 716.

Turbine exhaust stream 707 is typically condensed to knock out water, then routed to a carbon dioxide capture step in a membrane module 710 containing membranes 711 that are selectively permeable to carbon dioxide over nitrogen and to carbon dioxide over oxygen. Membranes and modules are as described above with respect to the invention embodiment depicted schematically in FIG. 1A.

Turbine exhaust stream 707 is flowed across the feed side of the membranes 711. A partially concentrated carbon dioxide product stream 712 is then withdrawn from the permeate side of the membrane 711.

A carbon dioxide-depleted stream 713 is withdrawn from the feed side of the membrane unit 710. This carbon dioxide-depleted stream 713 is then routed to the feed side of a membrane separation module 714 that is adapted to be operated in sweep mode. Membrane module 714 contains membranes 715 that are selectively permeable to carbon dioxide over nitrogen and to carbon dioxide over oxygen, and having the properties described above with respect to the membranes used in the sweep-based membrane separation step in the invention embodiment depicted schematically in FIG. 1A.

As discussed above, the feed gas 713 flows across the feed side of the membranes 715, and a sweep gas 702 of air, oxygen-enriched air, or oxygen flows across the permeate side, to provide or augment the driving force for transmembrane permeation. The sweep stream 702 picks up the preferentially permeating carbon dioxide, and the resulting combined permeate/sweep stream 716 is withdrawn from the membrane unit and is sent back to the power generation process as either one or both of diluent stream 708 and bypass stream 709.

Diluent stream 708 may be combined with optional additional air or oxygen supply stream 718, then compressed (compressor not shown in this figure) to form oxygen-containing gas stream 719, which is combined with fuel stream 701 to form feed stream 703 to the combustor 704. In the alternative, if post-, rather than pre-, combustion recycle is desired (which may require the presence of a second compressor train), diluent stream 708 may be omitted, and the entirety of the oxygen-containing gas stream 719 to the combustor 704 may be provided by air stream 718.

The residue stream 717 resulting from the sweep-based membrane separation step 714 is reduced in carbon dioxide content to less than about 5 volume %; more preferably, to less than 3 volume %; and, most preferably, to less than 2 volume %. The residue stream 714 is typically discharged to the environment as treated flue gas.

An alternative embodiment of the invention pertains to a combined cycle power generation process, where a portion of the turbine exhaust stream is withdrawn at higher than atmospheric pressure. The portion is then sent to a boiler, where it generates a boiler exhaust stream that is then sent to a membrane-based carbon dioxide capture step. The resulting carbon dioxide-depleted residue stream from the capture step is sent to a sweep-based membrane separation step. The residue stream from the sweep step is sent through a heat exchanger and a turbo-expander, and from there may be exhausted to the environment.

Figure 8:
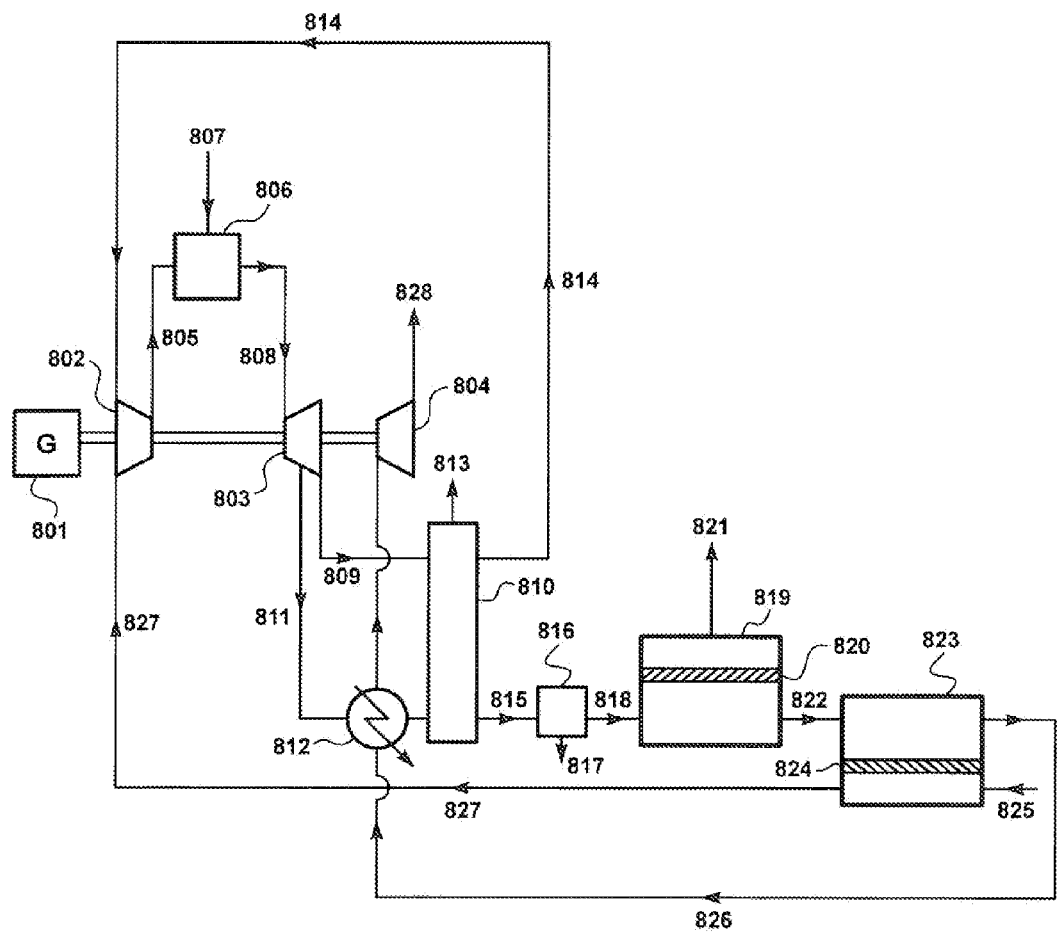
FIG. 8 is a schematic drawing of a flow scheme for a combined cycle power generation process where a portion of the turbine exhaust stream is withdrawn at higher than atmospheric pressure.

This process embodiment is depicted schematically in FIG. 8. Referring to the figure, incoming gas streams 814 and 827 are compressed from atmospheric pressure in an air compressor unit 802. Gas stream 814 originates from boiler 810; gas stream 827 originates from sweep-based membrane separation unit 823 (both of which streams are discussed below).

The resulting compressed gas stream 805 is then combusted with the incoming fuel gas 807 in combustor 806. The hot, high-pressure gas 808 from the combustor 806 is then expanded through the gas turbine 803. The gas turbine 803 is mechanically linked to the air compressor 802 and an electrical power generator 801. A first portion 811 of the resulting turbine exhaust stream is withdrawn at a pressure higher than atmospheric pressure (typically between about 2 bar to about 5 bar); a second portion 809 is withdrawn at or around atmospheric pressure.

The second portion 809 is routed to a boiler 810, creating steam 813 and a second boiler exhaust stream 814. The second boiler exhaust stream 814 is then routed back to the power generation process at compressor unit 802.

The first portion 811 of the turbine exhaust stream is routed through heat exchanger 812 to boiler 810. A second boiler exhaust stream 815 is withdrawn and, typically, routed through a condenser 816, from which water 817 drops out. Condensed stream 818 is then routed to a first membrane unit 819 that contains membranes 820 selective to carbon dioxide over nitrogen and oxygen. Membranes and modules are as described previously.

Condensed second boiler exhaust stream 818 flows across the feed side of membranes 820. A carbon dioxide-enriched permeate stream 821 is then withdrawn from membrane unit 819; this stream can be sent for further concentration or sequestration.

A carbon dioxide-depleted residue stream 822 is withdrawn from membrane unit 819 and sent for further treatment in a sweep-based membrane unit 823 that contains membranes 824 that are selective to carbon dioxide over nitrogen and oxygen. Membranes and modules are as described previously.

Residue stream 822 flows across the feed side of membranes 824; a sweep gas 825 of air, oxygen-enriched air, or oxygen flows across the permeate side. Carbon dioxide-enriched sweep/permeate stream 827 is routed back to the power generation process at compressor unit 802.

Carbon dioxide-depleted residue stream 826 is routed through heat exchanger 812 and secondary turbine recovery unit 804, from where it can be released to the environment as exhaust stream 828.

The invention is now further described by the following examples, which are intended to be illustrative of the invention, but are not intended to limit the scope or underlying principles in any way.

EXAMPLES

Example 1

Bases of Calculations for Other Examples (a) Membrane Permeation Experiments:

The following calculations were performed using a composite membrane having a polyether-based selective layer with the properties shown in Table 1.

TABLE 1

| Gas | Permeance (gpu)* | $CO_2$/Gas Selectivity |
|---|---|---|
| Methane | 90 | 11 |
| Nitrogen | 30 | 33 |
| Oxygen | 60 | 17 |
| Water | 5,000** | — |
| Carbon dioxide | 1,000 | — |

*Gas permeation unit; 1 gpu = $1 \times 10^{-6}$ cm$^3$(STP)/cm$^2 \cdot$ s $\cdot$ cmHg
**Estimated, not measured (b) Calculation Methodology:

All calculations were performed using a modeling program, ChemCad 5.6 (ChemStations, Inc., Houston, Tex.), containing code for the membrane operation developed by MTR's engineering group. For the calculations, all compressors and vacuum pumps were assumed to be 75% efficient. In each case, the modeling calculation was performed to achieve the following results:

a concentration of at least about 15 volume % oxygen in the oxygen-containing gas feed to the combustor;

a concentration of at least about 2 volume % oxygen in the combustor exhaust stream (as a measure of complete combustion of methane);

an oxygen-containing gas flow volume to the gas turbine which provides at least twice the stoichiometric volume of oxygen needed for complete fuel combustion (as a measure of dilution of the combustion gas for adequate temperature control in the turbine);

carbon dioxide recovery of at least about 80% in the carbon dioxide-rich product stream.

Each calculation was performed reiteratively, varying the membrane area, sweep area flow to the membrane, and split ratios between the portions of exhaust gas recycled, withdrawn, and passed to the membrane separation step until the above desired set of results was achieved.

Figure 3:
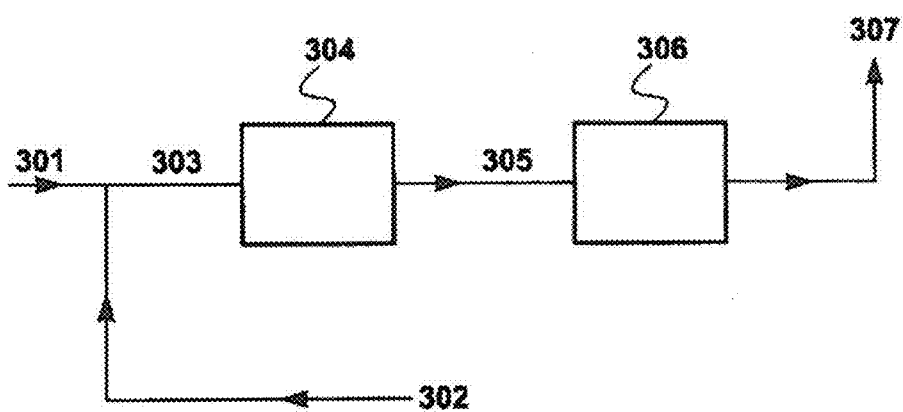
FIG. 3 is a schematic drawing of a flow scheme for a power generation process that does not include carbon dioxide recycle or a sweep-based membrane separation step (not in accordance with the invention).

(c) "No Membrane/No Recycle" Example:

A computer calculation was performed to determine the chemical composition of untreated exhaust gas from a natural gas combustion process, such as might occur in a 500 MW combined cycle power plant using about twice the stoichiometric ratio of oxygen to fuel. FIG. 3 is a schematic drawing of a flow scheme for a combustion process that does not include either a recycle step or a sweep-based membrane separation step.

Referring to FIG. 3, natural gas stream 301 and air stream 302 are introduced as feed stream 303 into combustion step or zone 304. (The combustion step and the oxygen with which the fuel is combined are as described in the Detailed Description, above.) To allow for cooling of the turbine, air is assumed to be provided at two times the stoichiometric amount required for combustion.

Combustion exhaust stream 305 is withdrawn, then routed through gas turbine 306 and a condenser (not shown) to knock water out of the stream. The chemical composition of the resulting untreated gas stream 307 was then calculated. The results of this calculation are shown in Table 2.

TABLE 2

| | Stream | | | | |
|---|---|---|---|---|---|
| | Methane (301) | Air Stream (302) | Feed Gas to Combustor (303) | Combustion Exhaust Gas (305) | Turbine Exhaust Gas (307) |
| Parameter | | | | | |
| Total Flow (kg/h) | 86,000 | 3,290,000 | 3,376,000 | 3.376,000 | 3,240,000 |
| Temperature (° C.) | 30 | 30 | 30 | 1,000 | 30 |
| Pressure (bar) | 30 | 30 | 30 | 1.0 | 1.1 |
| | | | Component (vol %) | | |
| Methane | 100 | 0 | 4.5 | 0 | 0 |
| Oxygen | 0 | 21.0 | 20.1 | 11.1 | 11.8 |
| Nitrogen | 0 | 79.0 | 75.5 | 75.5 | 80.5 |
| Carbon Dioxide | 0 | 0 | 0 | 4.5 | 4.8 |
| Water | 0 | 0 | 0 | 9.0 | 2.8 |

After the water vapor in the stream is condensed, the carbon dioxide concentration in the turbine exhaust stream 307 is 4.8 volume %, which is too low to enable economical carbon dioxide capture by traditional means, such as absorption or low-temperature condensation. Emitting such a flue gas stream from a power plant would release over 6,000 tons of carbon dioxide per day to the environment.

Example 2

Combustion Process with Partial Flue Gas Recycle and No Sweep-Based Membrane Separation (not in Accordance with the Invention)

Figure 4:
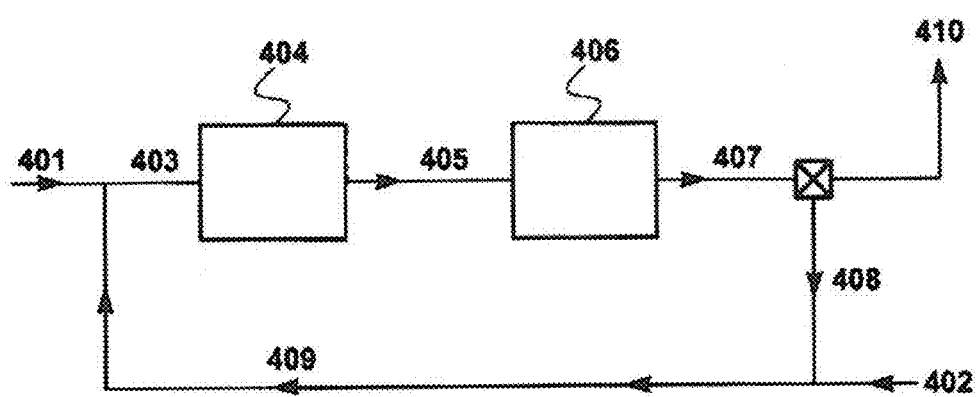
FIG. 4 is a schematic drawing of a flow scheme for a power generation process that does not include a sweep-based membrane separation step, but in which a portion of the exhaust stream generated in the power generation process is routed from the turbine back to the combustor (not in accordance with the invention).

A computer calculation was performed to determine the chemical composition of exhaust gas from a natural gas combustion process, with partial flue gas recycle and no membrane sweep. The process differed from the base-case calculation of Example 1 in that the intake of air was reduced to about half that of Example 1 (in other words, the minimum amount to provide for complete combustion), and the remainder of the gas required for temperature and flow control in the combustor was assumed to be provided by recirculating a portion of the combustion exhaust gas to the combustor inlet, as is commonly done. FIG. 4 is a schematic drawing of a flow scheme for such a combustion process.

Referring to FIG. 4, natural gas stream 401 and compressed oxygen-containing gas stream 409 are introduced as feed stream 403 into combustion step or zone 404. Stream 409 is made up of recycled exhaust stream 408 and additional air or oxygen supply stream 402.

Combustion exhaust stream 405 is withdrawn, then routed through gas turbine 406 and a condenser (not shown) to knock water out of the stream. The dehydrated turbine exhaust stream 407 is then routed through a splitter, where it is divided into a first portion 408 and a second portion 410. The first portion 408 of the dehydrated exhaust stream is combined with additional air stream 402 and routed back to the combustor 404 as oxygen-containing gas stream 409. The second portion 410 is withdrawn.

The chemical composition of the portion 408 of the untreated gas stream which is routed back to the combustor 404 was then calculated. The results of this calculation are shown in Table 3.

To facilitate operation of the calculation software, for Examples 2 through 9, the base case air flow provided to the combustor via the membrane permeate side was assumed to be about 975 m$^3$/h (1,250 kg/h), compared with the typical air flow to a 500 MW power plant of about 1.8 million m$^3$/h used for the calculation of Example 1. In other words, the scale of the calculation for the following Examples was about 1/1,200 of the scale for a typical natural gas-fired power plant. This reduces membrane area proportionately, but does not affect the relative flow rates or compositions of the streams involved.

TABLE 3

| Parameter/Stream | Methane (401) | Air Stream (402) | Feed Gas to Combustor (403) | Combustion Exhaust Gas (405) | Turbine Exhaust Gas (407) | Recycle Gas (408) |
|---|---|---|---|---|---|---|
| Total Flow (kg/h) | 71.6 | 1,370 | 1,440 | 1,440 | 1,300 | 1,370 |
| Temperature (° C.) | 30 | 30 | 30 | 1,000 | 30 | 30 |
| Pressure (bar) | 30 | 30 | 30 | 1.0 | 1.1 | 1.1 |
| Component (vol %) | | | | | | |
| Methane | 100 | 0 | 8.6 | 0 | 0 | 0 |
| Oxygen | 0 | 21.0 | 19.2 | 2.0 | 2.4 | 2.4 |
| Nitrogen | 0 | 79.0 | 72.2 | 72.2 | 84.7 | 84.7 |
| Carbon Dioxide | 0 | 0 | 0 | 8.6 | 10.0 | 10.0 |
| Water | 0 | 0 | 0 | 17.2 | 2.8 | 2.8 |

By recycling a portion of the turbine exhaust gas back to the combustor, the oxygen content the feed gas 403 is reduced to 19.2 volume %, but still enough to produce 2.0 volume % oxygen in the combustion exhaust gas 405. More importantly, the carbon dioxide in the exhaust gas stream 407 is increased to 10 volume %.

Example 3

Combustion Process with Membrane Sweep and No Flue Gas Recycle (Not in Accordance with the Invention)

Figure 5:
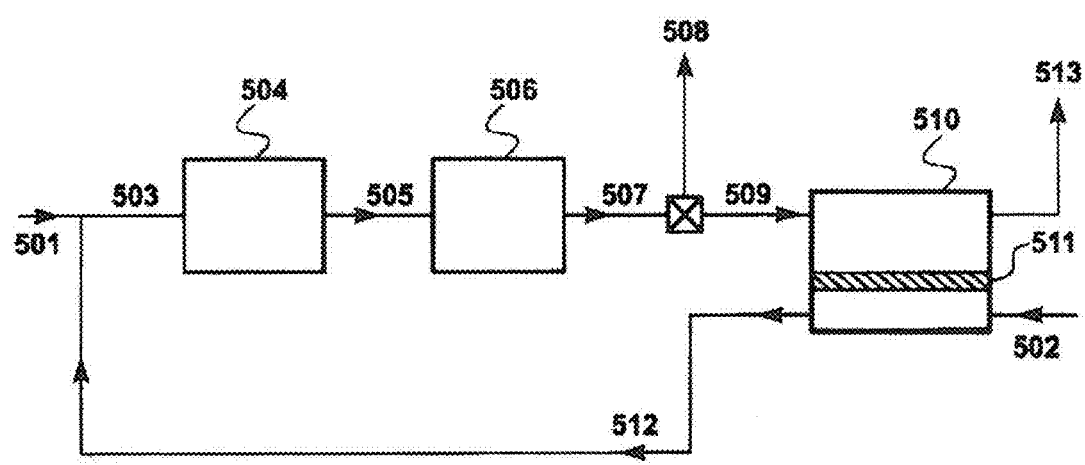
FIG. 5 is a schematic drawing of a flow scheme for a power generation process that includes a sweep-based membrane separation step, but no recycle of combustion exhaust gas from the turbine to the combustor (not in accordance with the invention).
Figure 6:
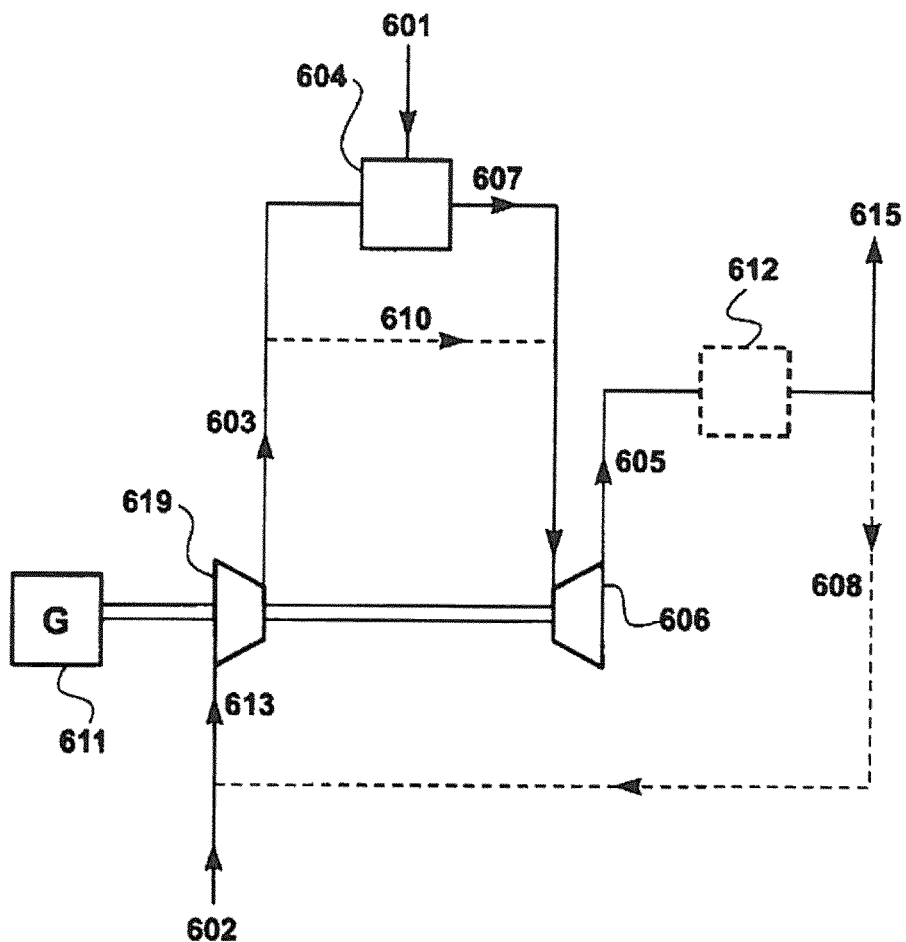
FIG. 6 is a schematic drawing of a flow scheme for a conventional gas turbine power generation process (not in accordance with the invention).

A computer calculation was performed to determine the chemical composition of exhaust gas from a natural gas combustion process, with membrane sweep, but no flue gas recycle. FIG. 5 is a schematic drawing of a flow scheme for such a combustion process.

Referring to FIG. 5, natural gas stream 501 and compressed combined sweep/permeate stream 512 are introduced as feed stream 503 into combustion step or zone 504. The mass flow rate of the natural gas stream 501 was 71.6 kg/h.

Combustion exhaust stream 505 is withdrawn, then routed through gas turbine 506 and a condenser (not shown) to knock water out of the stream. The dehydrated turbine exhaust stream 507 is then routed through a splitter, where it is divided into a first portion 508 and a second portion 509. In this example, the first portion 508 and the second portion 509 were in a ratio of 1:5.6 (flow to carbon dioxide withdrawal:flow to membrane separation). The first portion 508 of the dehydrated exhaust stream is withdrawn; the second portion 509 is sent for treatment in a sweep-based membrane separation step 510 using membranes 511 having the properties listed in Table 1. A sweep stream 502 of air is flowed across the permeate side of the membrane. The flow rate of sweep stream 502 was 2,070 kg/h.

The resulting permeate stream 512 is then routed back to the combustor 504. The exhaust stream 513 is released to the atmosphere. The chemical compositions of the various streams were calculated. The results of this calculation are shown in Table 4.

TABLE 4

| Parameter/Stream | Gas to Combustor (503) | Flue Gas (505) | CO2 Product (508) | Membrane Feed (509) | Membrane Permeate (512) | Exhaust Gas (513) |
|---|---|---|---|---|---|---|
| Total Flow (kg/h) | 3,070 | 3,070 | 440 | 2,470 | 3,000 | 1,550 |
| Temperature (° C.) | 30 | 1,000 | 30 | 30 | 30 | 30 |
| Pressure (bar) | 30 | 30 | 1.1 | 1.1 | 1.1 | 1.0 |
| Component (vol %) | | | | | | |
| Methane | 4.5 | 0 | 0 | 0 | 0 | 0 |
| Oxygen | 14.4 | 5.4 | 5.9 | 5.9 | 15.1 | 9.9 |
| Nitrogen | 60.0 | 60.0 | 65.6 | 65.6 | 62.8 | 88.4 |
| Carbon Dioxide | 19.0 | 23.5 | 25.6 | 25.6 | 19.9 | 1.7 |
| Water | 2.2 | 11.2 | 2.8 | 2.8 | 2.3 | 0 |

The oxygen content of the untreated flue gas 505 was 5.4 volume %. The carbon dioxide content of withdrawn product stream 508 was 25.6 volume %. The oxygen content of the membrane permeate stream 512 that is routed back to the combustor was 15.1 volume %. The carbon dioxide content of the exhaust stream 513 that is to be released to the environment was reduced to 1.7 volume %. Total carbon dioxide recovery from the process was 79.3 volume %.

To achieve these results required a membrane area of 1,800 m², a sweep stream flow rate of 2,070 kg/h, and a split ratio between gas withdrawn as stream 508 and gas sent as stream 509 for treatment in the membrane of about 1:5.

Example 4

Combustion Process with Membrane Sweep and Post-Combustion Flue Gas Recycle with 1:5 Split Ratio (in Accordance with the Invention)

The calculations for this Example were performed using the flow scheme shown in FIG. 1B and described in the Detailed Description, above. This flow scheme includes a sweep-based membrane separation step 162, which was assumed to be carried out using membranes 163 having the permeation properties listed in Table 1.

The mass flow rate of the natural gas stream 161 was 71.6 kg/h. The results of this calculation are shown in Table 5.

TABLE 5

| Parameter/Stream | Gas to Combustor (153) | Flue Gas (155) | Recycle Gas (158) | CO2 Product (160) | Membrane Feed (161) | Membrane Permeate (164) | Exhaust Gas (165) |
|---|---|---|---|---|---|---|---|
| Total Flow (kg/h) | 2,600 | 2,600 | 490 | 430 | 2,000 | 2,500 | 1,250 |
| Temperature (° C.) | 30 | 1,000 | 30 | 30 | 30 | 30 | 30 |
| Pressure (bar) | 30 | 30 | 1.1 | 1.1 | 1.1 | 1.1 | 1.0 |
| Component (vol %) | | | | | | | |
| Methane | 5.3 | 0 | 0 | 0 | 0 | 0 | 0 |
| Oxygen | 14.2 | 3.6 | 4.0 | 4.0 | 4.0 | 15.0 | 7.7 |
| Nitrogen | 59.9 | 59.9 | 66.7 | 66.7 | 66.7 | 63.2 | 90.2 |
| Carbon Dioxide | 18.5 | 23.8 | 26.4 | 26.4 | 26.4 | 19.5 | 2.0 |
| Water | 2.1 | 12.7 | 2.8 | 2.8 | 2.8 | 2.2 | 0 |

The oxygen content of the untreated flue gas 155 was 3.6 volume %. The carbon dioxide content of the recycle gas stream 158 and the withdrawn product stream 160 was 26.4 volume %, and the oxygen content of the gas was 4.0 volume %. The oxygen content of the membrane permeate stream 164 that is routed back to the combustor was 15.0 volume %. This was enough to combust the incoming fuel gas without a problem. However, if mixed with stream 158 before the combustor, the oxygen content would not be sufficient to produce a stable flame in the combustor. For this reason, the recycle (diluent).gas stream 158 is mixed with the stream 155 after combustion. This mixing process could occur within the turbine or before the turbine.

As described above, mixing the recycle gas stream with the main gas stream after the combustion step maintains a higher oxygen concentration in the combustor, but the process requires two compressors. One compressor is used to compress stream 159, and another compressor is used to compress bypass stream B1. If the gas is mixed before the combustion, then the oxygen content of the gas in the combination will be lower, which may produce flame stability problems, but only one compressor is required for mixed stream 159.

The carbon dioxide content of the exhaust stream 165 that is to be released to the environment was 2.0 volume %. Total carbon dioxide recovery from the process was 78.7 volume %.

To achieve these results required a membrane area of 1,320 m², a sweep stream flow rate of 1,760 kg/h, and split ratios 1:5 (flow to recycle:flow to carbon dioxide withdrawal and sweep-based membrane separation step) and 1:4.9 (flow to withdrawal:flow to sweep).

Comparing Examples 3 and 4, it can be seen that the process of the invention, incorporating both sweep-based membrane separation and recycle of a portion of untreated flue gas, offers benefits and advantages. The invention can achieve comparable results, in terms of concentration of carbon dioxide in the product stream and total carbon dioxide recovery, using considerably less membrane area and a smaller flow of sweep gas.

Example 5

Combustion Process with Membrane Sweep and Post-Combustion Flue Gas Recycle, with 1:3 Split Ratio (in Accordance with the Invention)

The calculations for this Example were performed using the flow scheme shown in FIG. 1B and described in the Detailed Description, above. This flow scheme includes a sweep-based membrane separation step 162, which was assumed to be carried out using membranes 163 having the permeation properties listed in Table 1.

The mass flow rate of the natural gas stream 151 was 71.6 kg/h. The results of this calculation are shown in Table 6.

TABLE 6

| Parameter/Stream | Gas to Combustor (153) | Flue Gas (155) | Recycle Gas (158) | CO2 Product (160) | Membrane Feed (161) | Membrane Permeate (164) | Exhaust Gas (165) |
| --- | --- | --- | --- | --- | --- | --- | --- |
| Total Flow (kg/h) | 2,350 | 2,350 | 730 | 420 | 1,800 | 2,280 | 1,100 |
| Temperature (° C.) | 30 | 1,000 | 30 | 30 | 30 | 30 | 30 |
| Pressure (bar) | 30 | 30 | 1.1 | 1.1 | 1.1 | 1.1 | 1.0 |
| Component (vol %) | | | | | | | |
| Methane | 5.8 | 0 | 0 | 0 | 0 | 0 | 0 |
| Oxygen | 14.1 | 2.5 | 2.8 | 2.8 | 2.8 | 15.0 | 6.3 |
| Nitrogen | 59.8 | 59.8 | 67.3 | 67.3 | 67.3 | 63.4 | 91.4 |
| Carbon Dioxide | 18.3 | 24.1 | 27.1 | 27.1 | 27.1 | 19.4 | 2.3 |
| Water | 2.0 | 13.6 | 2.8 | 2.8 | 2.8 | 2.2 | 0 |

The oxygen content of the untreated flue gas 155 was 2.5 volume %. The carbon dioxide content of the recycle gas stream 158 and the withdrawn product stream 160 was 27.1 volume %. The oxygen content of the membrane permeate stream 164 that is routed back to the combustor was 15.0 volume %. The carbon dioxide content of the exhaust stream 165 that is to be released to the environment was 2.3 volume %. Total carbon dioxide recovery from the process was 79.0 volume %.

To achieve these results required a membrane area of 1,110 m², a sweep stream flow rate of 1,610 kg/h, and split ratios of 1:3 (flow to recycle:flow to carbon dioxide withdrawal and sweep-based membrane separation step) and 1:4.2 (flow to withdrawal:flow to sweep-based membrane separation).

Compared with Example 4, the membrane area and the air flow to the combustor were both decreased, and the amount of gas recycled to the combustor was increased; however, similar overall results were achieved.

Example 6

Combustion Process with Two Membrane Steps and Post-Combustion Flue Gas Recycle, with 1:3 Split Ratio (in Accordance with the Invention)

The calculations for this Example were performed using the flow scheme shown in FIG. 2B and described in the Detailed Description, above. This flow scheme includes a membrane-based carbon dioxide capture step 260, followed by a sweep-based membrane separation step 264. The membrane steps 260 and 264 were assumed to be carried out using membranes 261 and 265 having the permeation properties listed in Table 1.

The mass flow rate of the natural gas stream 251 was 71.6 kg/h. The results of this calculation are shown in Table 7.

TABLE 7

| Parameter/Stream | Gas to Combustor (253) | Flue Gas (255) | Recycle Gas (258) | CO2 Product (262) | Membrane Feed (263) | Membrane Permeate (266) | Exhaust Gas (267) |
| --- | --- | --- | --- | --- | --- | --- | --- |
| Total Flow (kg/h) | 2,300 | 2,300 | 720 | 215 | 1,930 | 2,230 | 1,400 |
| Temperature (° C.) | 30 | 1,000 | 30 | 30 | 30 | 30 | 30 |
| Pressure (bar) | 30 | 30 | 1.1 | 0.375 | 1.1 | 1.1 | 1.0 |
| Component (vol %) | | | | | | | |
| Methane | 5.8 | 0 | 0 | 0 | 0 | 0 | 0 |
| Oxygen | 14.8 | 3.2 | 3.6 | 2.4 | 3.7 | 15.7 | 6.7 |
| Nitrogen | 63.8 | 63.8 | 71.7 | 26.6 | 75.8 | 67.7 | 91.6 |
| Carbon Dioxide | 13.8 | 19.6 | 21.9 | 61.6 | 18.3 | 14.6 | 1.7 |
| Water | 1.8 | 13.4 | 2.8 | 9.5 | 2.2 | 1.9 | 0 |

The oxygen content of the untreated flue gas 255 was 3.2 volume %. The carbon dioxide content of the recycle gas stream 258 was 21.9 volume %. The carbon dioxide content of the product stream 262 after the first membrane step 260 was 61.6 volume %. The oxygen content of the membrane permeate stream 266 that is routed back to the combustor was 15.7 volume %. The carbon dioxide content of the exhaust stream 267 that is to be released to the environment was 1.7 volume %. Total carbon dioxide recovery from the process was 80.5 volume %.

To achieve these results required a total membrane area of 1,775 m² (425 m² for the first membrane step and 1,350 m² for the second membrane step), a sweep stream flow rate of 1,700 kg/h, and a split ratio of 1:3 (flow to recycle:flow to membrane steps).

This process uses only 1.1% of the energy generated by the power generation process (5.6 kW out of a total of 491 kW). This example shows that the carbon dioxide capture membrane can achieve carbon dioxide purity up to nearly 62 volume % using very little extra energy. At the same time, the sweep flow rate and the total membrane area are modest.

Example 7

Combustion Process with Two Membrane Steps and Pre-Combustion Flue Gas Recycle, with 1:3 Split Ratio (in Accordance with the Invention)

The calculations for this Example were performed using the flow scheme shown in FIG. 2B and described in the Detailed Description, above. This flow scheme includes a membrane-based carbon dioxide capture step 260, followed by a sweep-based membrane separation step 264. The membrane steps 260 and 264 were assumed to be carried out using membranes 261 and 265 having the permeation properties listed in Table 1.

Unlike in the previous examples, where the recycle gas 258 is sent back to the power generation process between the combustion step 254 and the turbine step 256, in this example, the recycle gas, D1, is sent back to the power generation process prior to the combustion step 254. In this example, the recycle gas 258 was assumed to have been run through only one compressor (not shown) before being returned to the power generation process.

The mass flow rate of the natural gas stream 251 was 71.6 kg/h. The results of this calculation are shown in Table 8.

The oxygen content of the untreated flue gas 255 was 3.3 volume %. The carbon dioxide content of the recycle gas stream 269 was 21.9 volume %. The carbon dioxide content of the product stream 262 after the first membrane step 260 was 61.5 volume %. The oxygen content of the membrane permeate stream 266 that is routed to the combustor was 14.6 volume %. The carbon dioxide content of the exhaust stream 267 that is to be released to the environment was 1.7 volume %. Total carbon dioxide recovery from the process was 80.5 volume %.

To achieve these results required a total membrane area of 1,775 m² (425 m² for the first membrane step and 1,350 m² for the second membrane step), a sweep stream flow rate of 1,700 kg/h, and a split ratio of 1:3 (flow to recycle:flow to membrane steps).

The oxygen content of the feed gas stream 253 to the combustor was too low at 12.2 volume %, for the reasons described earlier. This may lead to flame stability and incomplete combustion of the methane fuel.

Example 8

Combustion Process with Two Membrane Steps and Pre-Combustion Flue Gas Recycle, with 1:10 Split Ratio (in Accordance with the Invention)

The calculations for this Example were performed using the flow scheme shown in FIG. 2B and described in the Detailed Description, above. This flow scheme includes a membrane-based carbon dioxide capture step 260, followed by a sweep-based membrane separation step 264. The membrane steps 260 and 264 were assumed to be carried out using membranes 261 and 265 having the permeation properties listed in Table 1. As in Example 7, in this example, the recycle gas, D1, is sent back to the power generation process prior to the combustion step 254.

The mass flow rate of the natural gas stream 251 was 71.6 kg/h. The results of this calculation are shown in Table 9.

TABLE 8

| Parameter/Stream | Gas to Combustor (253) | Flue Gas (255) | Recycle Gas (269) | CO2 Product (262) | Membrane Feed (263) | Membrane Permeate (266) | Exhaust Gas (267) |
|---|---|---|---|---|---|---|---|
| Total Flow (kg/h) | 3,010 | 3,010 | 720 | 215 | 1,930 | 2,230 | 1,400 |
| Temperature (° C.) | 30 | 1,000 | 30 | 30 | 30 | 30 | 30 |
| Pressure (bar) | 30 | 30 | 1.1 | 0.375 | 1.1 | 1.1 | 1.0 |
| Component (vol %) | | | | | | | |
| Methane | 4.5 | 0 | 0 | 0 | 0 | 0 | 0 |
| Oxygen | 12.2 | 3.3 | 3.6 | 2.4 | 3.9 | 15.7 | 6.7 |
| Nitrogen | 65.6 | 65.6 | 71.7 | 26.6 | 75.9 | 67.8 | 91.6 |
| Carbon Dioxide | 15.6 | 20.1 | 21.9 | 61.5 | 18.2 | 14.6 | 1.7 |
| Water | 2.0 | 11.0 | 2.8 | 9.5 | 2.2 | 1.9 | 0 |

TABLE 9

| Parameter/Stream | Gas to Combustor (253) | Flue Gas (255) | Recycle Gas (269) | CO2 Product (262) | Membrane Feed (263) | Membrane Permeate (266) | Exhaust Gas (267) |
|---|---|---|---|---|---|---|---|
| Total Flow (kg/h) | 2,940 | 2,940 | 255 | 250 | 2,290 | 2,615 | 1,760 |
| Temperature (° C.) | 30 | 1,000 | 30 | 30 | 30 | 30 | 30 |
| Pressure (bar) | 30 | 30 | 1.1 | 0.375 | 1.1 | 1.1 | 1.0 |
| Component (vol %) | | | | | | | |
| Methane | 4.5 | 0 | 0 | 0 | 0 | 0 | 0 |
| Oxygen | 15.1 | 6.1 | 6.7 | 5.4 | 6.8 | 16.7 | 9.6 |
| Nitrogen | 66.7 | 66.7 | 72.8 | 33.2 | 76.5 | 69.6 | 89.1 |
| Carbon Dioxide | 11.7 | 16.2 | 17.6 | 51.8 | 14.5 | 11.7 | 1.4 |
| Water | 1.9 | 10.9 | 2.8 | 9.6 | 2.2 | 1.9 | 0 |

The oxygen content of the untreated flue gas 255 was 6.1 volume %. The carbon dioxide content of the recycle gas stream 269 was 17.6 volume %. The carbon dioxide content of the product stream 262 after the first membrane step 260 was 51.8 volume %. The oxygen content of the membrane permeate stream 266 that is routed back to the combustor was 16.7 volume %. The oxygen content of the feed gas stream 253 to the combustor is now an acceptable 15.1 volume %. The carbon dioxide content of the exhaust stream 267 that is to be released to the environment was 1.4 volume %. Total carbon dioxide recovery from the process was 79.2 volume %.

To achieve these results required a total membrane area of 2,290 m$^2$ (640 m$^2$ for the first membrane step and 1,650 m$^2$ for the second membrane step), a sweep stream flow rate of 2,085 kg/h, and a split ratio of 1:10 (flow to recycle:flow to membrane steps).

Compared with Example 7, by increasing the membrane area and air flow, and decreasing the proportion of the turbine exhaust gas that is recycled back to the combustor, we were able to increase the amount of oxygen in the feed to the combustor back to an acceptable level of 15.1 volume %. This process uses only 1.3% of the energy generated by the power generation process (6.7 kW out of a total of 491 kW).

We claim:

1. A process for controlling carbon dioxide exhaust from combustion of a gaseous fuel, comprising:
   (a) performing a combustion step by combusting a mixture comprising a gaseous fuel and an oxygen-containing gas in a combustor, thereby generating a combustor exhaust stream comprising carbon dioxide and nitrogen;
   (b) routing the combustor exhaust stream as at least a portion of a working gas stream to a gas turbine, thereby generating electrical power and creating a turbine exhaust stream;
   (c) providing a first membrane having a first feed side and a first permeate side, and being selectively permeable to carbon dioxide over nitrogen and to carbon dioxide over oxygen;
   (d) passing at least a portion of the turbine exhaust stream across the first feed side;
   (e) withdrawing from the first permeate side a partially concentrated carbon dioxide first permeate stream;
   (f) withdrawing from the first feed side a carbon dioxide-depleted first residue stream;
   (g) providing a second membrane having a second feed side and a second permeate side, and being selectively permeable to carbon dioxide over nitrogen and to carbon dioxide over oxygen;
   (h) passing the first residue stream across the second feed side;
   (i) passing air, oxygen-enriched air, or oxygen as a sweep stream across the second permeate side;
   (j) withdrawing from the second feed side a second residue stream that is depleted in carbon dioxide compared to the first residue stream;
   (k) withdrawing from the second permeate side a second permeate stream comprising oxygen and carbon dioxide; and
   (l) passing at least a portion of the second permeate stream to a location between the combustor and the gas turbine as part of the working gas stream.

2. The process of claim 1, wherein the oxygen-containing gas comprises at least 15 volume % oxygen.

3. The process of claim 1, wherein the combustor exhaust stream comprises at least 2 volume % oxygen.

4. The process of claim 1, wherein the process recovers at least 80 volume % of the carbon dioxide generated by the combustion step into the partially concentrated carbon dioxide first permeate stream.

5. The process of claim 1, wherein the partially concentrated carbon dioxide first permeate stream contains at least 20 volume % carbon dioxide.

6. The process of claim 1, wherein the first membrane and the second membrane exhibit a selectivity for carbon dioxide over oxygen of at least 10.

* * * * *